United States Patent
Zhu et al.

(10) Patent No.: US 9,411,889 B2
(45) Date of Patent: *Aug. 9, 2016

(54) ASSIGNING DOCUMENT IDENTIFICATION TAGS

(75) Inventors: Huican Zhu, San Jose, CA (US); Anurag Acharya, Campbell, CA (US)

(73) Assignee: Google Inc., Mountain View, CA (US)

(*) Notice: Subject to any disclaimer, the term of this patent is extended or adjusted under 35 U.S.C. 154(b) by 1085 days.

This patent is subject to a terminal disclaimer.

(21) Appl. No.: 13/419,349

(22) Filed: Mar. 13, 2012

(65) Prior Publication Data

US 2012/0173552 A1 Jul. 5, 2012

Related U.S. Application Data

(63) Continuation of application No. 10/613,637, filed on Jul. 3, 2003, now Pat. No. 8,136,025.

(51) Int. Cl.
*G06F 17/00* (2006.01)
*G06F 17/30* (2006.01)
(Continued)

(52) U.S. Cl.
CPC ........ *G06F 17/30864* (2013.01); *G06F 17/303* (2013.01); *G06F 17/3053* (2013.01); *G06F 17/30112* (2013.01); *G06F 17/30867* (2013.01); *G06Q 30/02* (2013.01);
(Continued)

(58) Field of Classification Search
CPC .................. G06F 17/30864; G06F 17/30112; G06F 17/30; G06F 3/0482; G06F 17/303; G06F 17/30867; G06F 17/3053; G06Q 30/02; G06Q 30/0246; H04L 41/22; H04L 41/12; H04L 12/2602; H04L 3/00; H04L 43/45; H04L 67/14; H04L 67/2804; H04L 29/08072; H04L 29/06; H04L 29/0809; H04L 63/08; H04L 63/102
USPC ......... 715/862, 783, 273, 708, 201–203, 740, 715/745; 434/118, 362; 709/213–219
See application file for complete search history.

(56) References Cited

U.S. PATENT DOCUMENTS

D295,632 S  5/1988  Wells-Papanek et al.
D295,764 S  5/1988  Wells-Papanek et al.
(Continued)

OTHER PUBLICATIONS

Lev et al. (NPL—"Placing Search in context: The concept Revisited"—Pub—Jan. 1-5, 2001—Hong Kong—ACM) search ranking and re-ranking to reordering the merged list of results by comparing them semantically with both text and concept—p. 406-414.*
(Continued)

*Primary Examiner* — Quoc A Tran

(57) ABSTRACT

Document identification tags are assigned to documents to be added to a collection of documents. Based on query-independent information about a new document, a document identification tag is assigned to the new document. The document identification tag so assigned is used in the indexing of the new document. When a list of document identification tags are produced by an index in response to a query, the list is approximately ordered with respect to a measure of query-independent relevance. In some embodiments, the measure of query-independent relevance is related to the connectivity matrix of the World Wide Web. In other embodiments, the measure is related to the recency of crawling. In still other embodiments, the measure is a mixture of these two. The provided systems and methods allow for real-time indexing of documents as they are crawled from a collection of documents.

35 Claims, 15 Drawing Sheets

(51) Int. Cl.
*H04L 29/08* (2006.01)
*G06Q 30/02* (2012.01)
*H04L 12/24* (2006.01)
*H04L 29/06* (2006.01)

(52) U.S. Cl.
CPC ........... *G06Q 30/0246* (2013.01); *H04L 29/06* (2013.01); *H04L 29/0809* (2013.01); *H04L 29/08072* (2013.01); *H04L 41/12* (2013.01); *H04L 41/22* (2013.01); *H04L 63/08* (2013.01); *H04L 63/102* (2013.01); *H04L 67/14* (2013.01); *H04L 67/2804* (2013.01)

(56) References Cited

U.S. PATENT DOCUMENTS

| | | |
|---|---|---|
| 5,634,062 A | 5/1997 | Shimizu et al. |
| 5,721,914 A | 2/1998 | DeVries |
| D396,455 S | 7/1998 | Bier |
| 5,801,702 A | 9/1998 | Dolan et al. |
| 5,884,031 A | 3/1999 | Ice |
| 5,913,026 A | 6/1999 | Bleidt et al. |
| 5,920,701 A | 7/1999 | Miller et al. |
| 6,070,191 A | 5/2000 | Narendran et al. |
| 6,098,078 A | 8/2000 | Gehani et al. |
| 6,119,124 A | 9/2000 | Broder et al. |
| 6,134,596 A | 10/2000 | Bolosky et al. |
| 6,141,762 A | 10/2000 | Nicol et al. |
| 6,163,778 A | 12/2000 | Fogg et al. |
| 6,189,019 B1 | 2/2001 | Blumer et al. |
| 6,189,039 B1 | 2/2001 | Harvey et al. |
| 6,195,622 B1 | 2/2001 | Altschuler et al. |
| 6,223,226 B1 | 4/2001 | Miyahara |
| 6,233,571 B1 | 5/2001 | Egger et al. |
| 6,243,091 B1 | 6/2001 | Berstis |
| 6,263,364 B1 | 7/2001 | Najork et al. |
| 6,278,992 B1 | 8/2001 | Curtis et al. |
| 6,285,999 B1* | 9/2001 | Page |
| 6,292,880 B1 | 9/2001 | Mattis et al. |
| 6,336,123 B2 | 1/2002 | Inoue et al. |
| 6,366,947 B1 | 4/2002 | Kavner |
| 6,370,580 B2 | 4/2002 | Kriegsman |
| 6,374,336 B1 | 4/2002 | Peters et al. |
| 6,404,446 B1 | 6/2002 | Bates et al. |
| 6,418,452 B1 | 7/2002 | Kraft et al. |
| 6,427,172 B1 | 7/2002 | Thacker et al. |
| 6,467,046 B1 | 10/2002 | Cunliffe et al. |
| 6,477,548 B1 | 11/2002 | Nihei |
| 6,477,566 B1 | 11/2002 | Davis et al. |
| 6,484,204 B1 | 11/2002 | Rabinovich |
| 6,499,052 B1 | 12/2002 | Hoang et al. |
| D469,444 S | 1/2003 | Ording et al. |
| D472,244 S | 3/2003 | Wasko |
| D473,565 S | 4/2003 | Groves |
| 6,546,388 B1* | 4/2003 | Edlund et al. |
| 6,547,829 B1 | 4/2003 | Meyerzon et al. |
| D474,201 S | 5/2003 | Chaudhri |
| 6,606,643 B1 | 8/2003 | Emens et al. |
| 6,618,752 B1 | 9/2003 | Moore et al. |
| 6,631,369 B1 | 10/2003 | Meyerzon et al. |
| 6,665,658 B1 | 12/2003 | DaCosta et al. |
| 6,671,705 B1 | 12/2003 | Duprey et al. |
| 6,675,159 B1 | 1/2004 | Lin et al. |
| 6,687,696 B2 | 2/2004 | Hofmann et al. |
| 6,711,561 B1 | 3/2004 | Chang et al. |
| 6,711,568 B1 | 3/2004 | Bharat et al. |
| 6,718,361 B1 | 4/2004 | Basani et al. |
| 6,725,269 B1 | 4/2004 | Megiddo |
| 6,826,576 B2 | 11/2004 | Lulich et al. |
| 6,847,967 B1 | 1/2005 | Takano |
| 6,859,839 B1 | 2/2005 | Zahorjan et al. |
| 6,901,604 B1 | 5/2005 | Kiraly |
| 6,947,930 B2 | 9/2005 | Anick et al. |
| 6,970,937 B1 | 11/2005 | Huntington |
| 6,976,207 B1 | 12/2005 | Ruján et al. |
| 6,978,419 B1 | 12/2005 | Kantrowitz |
| 6,990,628 B1 | 1/2006 | Palmer et al. |
| 6,990,667 B2 | 1/2006 | Ulrich et al. |
| 6,996,668 B2 | 2/2006 | Gaertner et al. |
| 7,035,933 B2 | 4/2006 | O'Neal et al. |
| 7,039,173 B2 | 5/2006 | Tuunanen |
| 7,065,618 B1 | 6/2006 | Ghemawat et al. |
| 7,080,073 B1 | 7/2006 | Jiang et al. |
| 7,325,073 B2 | 1/2008 | Shao et al. |
| 2002/0023158 A1 | 2/2002 | Polizzi et al. |
| 2002/0038350 A1 | 3/2002 | Lambert et al. |
| 2002/0057678 A1 | 5/2002 | Jiang et al. |
| 2002/0059416 A1 | 5/2002 | Tuunanen |
| 2002/0059592 A1 | 5/2002 | Kiraly |
| 2002/0078014 A1 | 6/2002 | Pallmann |
| 2002/0078035 A1 | 6/2002 | Frank et al. |
| 2002/0087599 A1 | 7/2002 | Grant et al. |
| 2002/0103809 A1 | 8/2002 | Starzl et al. |
| 2002/0103968 A1 | 8/2002 | Grover |
| 2002/0120685 A1 | 8/2002 | Srivastava et al. |
| 2002/0138509 A1 | 9/2002 | Burrows et al. |
| 2002/0138559 A1 | 9/2002 | Ulrich et al. |
| 2002/0169818 A1 | 11/2002 | Stewart et al. |
| 2002/0194324 A1 | 12/2002 | Guha |
| 2003/0014399 A1 | 1/2003 | Hansen et al. |
| 2003/0014523 A1 | 1/2003 | Teloh et al. |
| 2003/0028726 A1 | 2/2003 | Gaertner et al. |
| 2003/0037131 A1 | 2/2003 | Verma |
| 2003/0046283 A1 | 3/2003 | Roberts |
| 2003/0101278 A1 | 5/2003 | Garcia-Luna-Aceves et al. |
| 2003/0130994 A1 | 7/2003 | Singh et al. |
| 2003/0131193 A1 | 7/2003 | Kodama et al. |
| 2003/0195881 A1* | 10/2003 | Koo et al. .......... 707/5 |
| 2003/0195883 A1 | 10/2003 | Mojsilovic et al. |
| 2003/0200307 A1 | 10/2003 | Raju et al. |
| 2003/0204571 A1 | 10/2003 | Waltermann |
| 2003/0212869 A1 | 11/2003 | Burkey |
| 2003/0225884 A1 | 12/2003 | Hayden |
| 2004/0019721 A1 | 1/2004 | Drerup et al. |
| 2004/0049673 A1 | 3/2004 | Song et al. |
| 2004/0093361 A1 | 5/2004 | Therrien et al. |
| 2004/0128383 A1 | 7/2004 | Hinton |
| 2004/0143672 A1 | 7/2004 | Padmanabham et al. |
| 2004/0205149 A1 | 10/2004 | Dillon et al. |
| 2004/0210575 A1 | 10/2004 | Bean et al. |
| 2004/0223615 A1 | 11/2004 | Dhawan |
| 2004/0260873 A1 | 12/2004 | Watanabe |
| 2005/0015436 A1 | 1/2005 | Singh et al. |
| 2005/0027685 A1 | 2/2005 | Kamvar et al. |
| 2005/0154887 A1 | 7/2005 | Birk et al. |
| 2005/0165778 A1 | 7/2005 | Obata et al. |
| 2005/0216845 A1 | 9/2005 | Wiener |
| 2005/0273514 A1 | 12/2005 | Milkey et al. |
| 2006/0129775 A1 | 6/2006 | Hulsey |
| 2006/0271705 A1 | 11/2006 | Garcia-Luna-Aceves |
| 2007/0174471 A1 | 7/2007 | Van Rossum |
| 2008/0005780 A1 | 1/2008 | Singleton |
| 2008/0016028 A1 | 1/2008 | Wilding et al. |

OTHER PUBLICATIONS

Taher et al. (NPL—"Evaluating Strategies for Similarity Search on the Web"—Pub—May 7-11, 2002—Honolulu—Hawaii—USA—ACM) mapping a hierarchy onto a partial ordering, given source document for similar search on the web—p. 432-442.*

Adam, N. et al., "Regeneration with Virtual Copies for Distributed Computing Systems," IEEE Transactions on Software Engineering, vol. 19, No. 6, Jun. 1993, 9 pages.

Alvarez, M. et al., "Client-Side Deep Web Data Extraction," IEEE International Conference on E-Commerce Technology for Dynamic E-Business, Sep. 13-15, 2004, 5 pages.

Bawa, M. et al., "Transience of Peers and Streaming Media," ACM SIGCOMM Computer Communications Review, vol. 33, No. 1, Jan. 2003, 6 pages.

Bharat, K. et al., "A Comparison of Techniques to Find Mirrored Hosts on the WWW," Proceedings Workshop on Organizing Web Space at 4th ACM Conference on Digital Libraries, Aug. 25, 1999, 19 pages.

(56) References Cited

OTHER PUBLICATIONS

Bharat, K. et al., "Mirror, Mirror on the Web: A Study of Host Pairs with Replicated Content," In the Proceedings of the Eighth International World Wide Web Conference, 1999, 17 pages.
Brin, S. et al., "Copy Detection Mechanisms for Digital Documents," Proceedings of the ACM SIGMOD International Conference on Management of Data, Oct. 31, 1994, 21 pages.
Brin, S. et al., "The Anatomy of a Large-Scale Hypertextual Web Search Engine," Computer Networks and ISDN Systems, 1998, 11 pages.
Broder, A.Z., "On Resemblance and Containment of Documents," Proceedings of Compression and Complexity of Sequences, IEEE Computer Society, 1997, 9 pages.
Brusilovsky, P., et al, "Map-Based Horizontal Navigation in Educational Hypertext," HT'02, Jun. 11-15, 2002, 10 pages.
Cerf, V. et al., "Specification of Internet Transmission Control Program," RFC 675, Specification of Internet Transmission Control Program, Dec. 1974, 141 pages.
Chawathe, Y. et al., "An Architecture for Internet Content Distribution as an Infrastructure Service," http://www.cs.berkeley.edu/~yatin/papers/scatterca, 2000, 16 pages.
Chawathe, Y., "Scattercast: An Architecture for Internet Broadcast Distribution as an Infrastructure Service ," Dissertation of Yatin Dilip Chawathe, University of California at Berkeley, Fall 2000, 161 pages.
Cho, J., et al., "Finding Replicated Web Collections," Proceedings of the ACM SIGMOD International Conference on Management of Data, 25 pages, 2000.
Chowdhury, A., et al., "Collection Statistics for Fast Duplicate Document Detection," ACM Transactions on Information Systems, vol. 20, No. 2, Apr. 2002, 21 pages.
Cohen, B., "Incentives Build Robustness in Bit Torrent, bram@bitconjurer.org, May 22, 2003, 5 pages.
Haveliwala, T., "Topic-Sensitive Page Rank," WWW2002, May 7-11, 2002, 10 pages.
Henzinger, M. et al., "Challenges in Web Search Engines," Internet Mathematics, vol. 1, No. 1, Oct. 17, 2002, 14 pages.
Ipeirotis, P. et al., "Extending SDARTS: Extracting Metadata from Web Databases and Interfacing with the Open Archives Initiative," Proceedings of the $2^{nd}$ ACM/IEEE-CS Joint Conference on Digital Libraries Table of Contents, 2002, 9 pages.
Jeh, G. et al., "Scaling Personalized Web Search," WWW2003, May 20-24, 2003, 9 pages.
Kamvar, S. et al., "Exploiting the Block Structure of the Web for Computing Page Rank," Stanford University Technical Report, Jun. 2003, 14 pages.
Kelly, T. et al., "Aliasing on the World Wide Web: Prevalence and Performance Implications," Proceedings of the $11^{th}$ International World Wide Web Conference, May 7-11, 2002, 11 pages.
Kletnberg, J., "Authoritative Sources in a Hyperlinked Environment," Journal of the ACM, vol. 46, No. 5, Sep. 1999, 29 pages.
Koman, R., "How the Wayback Machine Works," XML.com, Jan. 21, 2002, 6 pages.
Kristol, D. et al., "HTTP State Management Mechanism," RFC 2965, HttP Saae Manlagement Mechanism, Oct. 2000, 25 pages.
Leuski, A.,"Evaluating Document Clustering for Interactive Information Retrieval," Proceedings of the $10^{th}$ Int'l Conference on Information and Knowledge, 2001, 13 pages.
Miller, R., "WebSPHINX: A Personal, Customizable Web Crawler," http://www.cs.cmu.edu/~rcm/websphinx, Jul. 8, 2002, 8 pages.
Nguyen, T. et al., "Distributed Video Streaming Over Internet," Proc. SPIE, vol. 4673, 2002, 10 pages.
Notess, G., "The Wayback Machine: The Web's Archive," Online, vol. 26, No. 2, Mar./Apr. 2002, 4 pages.
Osokine, S., "Search Optimization in the Distributed Networks," http://www.grouter.net/gnutella/search.lhtm, Oct. 15, 2002, 65 pages.
Padmanabhan, V. et al., "Distributing Streaming Media Content Using Cooperative Networking," NOSSDAV '02, May 12-14, 2002, 10 pages.
Postel, J. et al., "File Transfer Protocol (FTP)," Obsoletes RFC 765 (IEN 149) Oct. 1985, 69 pages.
Raghavan, S. et al., "Crawling the Hidden Web," Technical Report, Stanford, Dec. 7, 2000, 26 pages.
Rowstron A. et al., "Storage Management and Caching in PAST, a Large-Scale, Persistent Peer-to-Peer Storage Utility," SOSP-18, Nov. 2001, 13 pages.
Sarawagi, S., et al., "Interactive Deduplication Using Active Learning," Proceeding of the 8th ACM SIGKDD Int'l Conf. on Knowledge, Discovery and Data Mining, Jul. 2002, 10 pages.
Shivakumar, N., et al., "Finding Near-Replicas of Documents on the Web," in World Wide Web and Databases, International Workshop WebDB'98, Mar. 1998, 4 pages.
Smith, B. et al., "Exploiting Result Equivalence in Caching Dynamic Web Content," USENIX Symposium on Internet Technology and Systems, Oct. 1999. 12 pages.
Stoica, I. et al., "Chord: A Scalable Peer-to-Peer Lookup Service for Internet Applications," MIT Laboratory for Computer Science, Jan. 10, 2002, 45 pages.
Tsoi, "Structure of the Internet?" Faculty of Informatics-Papers, Univ. of Wollongong, 2001, 5 pages.
Wang, J. et al., "Web Search Services," Univ. of Science & Technology, Hong Kong, Computer Science Technical Report, HKUST-CS02-26, Jan. 1999, 35 pages.
Wolfson O. et al., "An Adaptive Data Replication Algorithm," ACM Transactions on Database Systems, vol. 22, No. 2, Jun. 1997, 60 pages.
Wolfson O. et al., "Distributed Algorithms for Dynamic Replication of Data," 11th Principles of Database Systems, Jun. 1992, 15 pages.
Zhao, B. et al., Tapestry: An Infrastructure for Fault-Tolerant Wide-Area Location and Routing, Computer Science Division (EECS), University of California, Berkeley, Apr. 2001, 28 pages.
Leake, Towards Context-Based Search Engine Selection, 2001, 4 pgs, Computer Science Dept., Indiana University, Bloomington, IN.
Menczer, Evaluating Topic-Driven Web Crawlers, 2001, 9 pgs, The University of Iowa, Iowa City, IA.

\* cited by examiner

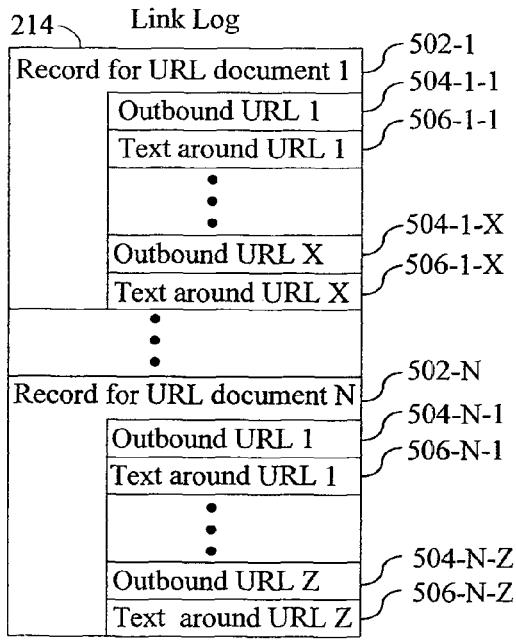
Fig. 5A
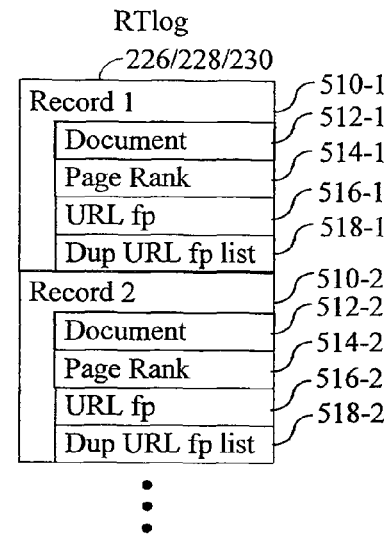
Fig. 5B
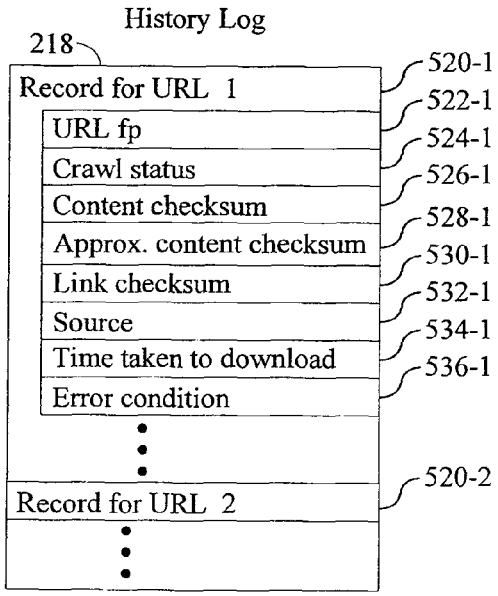
Fig. 5C
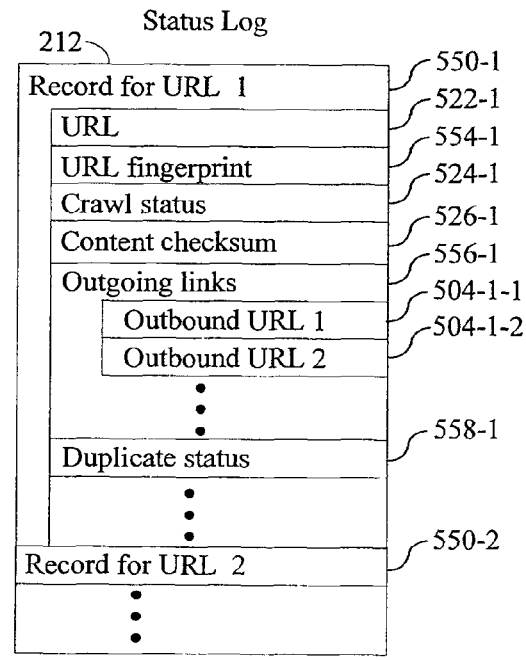
Fig. 5D
Fig. 5

ASSIGNING DOCUMENT IDENTIFICATION TAGS

RELATED APPLICATIONS

This application is a continuation of U.S. patent application Ser. No. 10/613,637, filed Jul. 3, 2003 now U.S. Pat. No. 8,136,025, "Assigning Document Identification Tags," which is hereby incorporated by reference in its entirety.

FIELD OF THE INVENTION

The present invention relates to the field of search engines for locating documents in a collection of documents, such as a collection of documents stored on servers coupled to the Internet or in an intranet, and in particular the present invention relates to a method and apparatus for assigning document identification tags to documents to be inserted into an index of the collection of documents, the index arranged and document identification tags assigned so that documents with high relevance appear earlier in a list of documents returned by the index in response to a query, even when not all the documents to be indexed are available for sorting as document identification tags are assigned and documents inserted into the index.

BACKGROUND OF THE INVENTION

Development of a search engine that can index a large and diverse collection of documents, yet return to a user a short, relevant list of result documents in response to a query has long been recognized to be a difficult problem. Various metrics of relevance of a document have been developed in an attempt to solve this problem. One class of such metrics is the query-independent metrics. The metrics represent the relative importance or relevance of a document to a user independent of any query submitted. Examples of query-independent metrics include, but are not limited to, simple criteria based on intrinsic properties of the document itself (i.e., the length of the document), ad-hoc rules for assigning relevance based on preassigned authority of a hosting site, and automatic determinations of relevance based on extrinsic information about the document. An example of an automatic relevance criterion based on extrinsic information is PageRank, described in detail in U.S. Pat. No. 6,285,999, hereby incorporated by reference in its entirety.

One goal of search engine design is to index documents in such a way that a list of documents returned in response to a query is approximately ordered in decreasing relevance. This task is made easier if the list of documents is ordered in terms of decreasing query-independent relevance. For computational efficiency, it is desirable that the internal representation of documents in the index reflect such an ordering. In this way, the list of documents returned to the user will contain the most highly relevant documents (as measured by a query-independent relevance metric), even when only the first few documents in the index are returned. Extracting only the first few documents from the index has advantages in computational efficiency, a critical factor when hundreds of millions of queries are served per day.

In search engine systems that retrieve ("crawl") and evaluate the entire contents of a collection of documents before building an index, the index is readily assembled to return documents in order of decreasing query-independent relevance. Some indexes employ an internal representation of a particular document, referred to as a document identification tag. In some systems, the document identification tags are integers. By examining the query-independent relevance of a document relative to the collection of documents prior to the assignment of a document identification tag to the document, it is possible to assign a document identification tag that encodes this information. For example, assuming sufficient computational resources, the entire collection of documents could be sorted in order of decreasing query-independent relevance and document identification tags assigned in sequential order to documents in the sorted list.

However, as the number of documents in the Internet grows, it takes ever longer time periods between the time when a page is crawled by a robot and the time that it can be indexed and made available to a search engine. Furthermore, it takes ever longer time periods to replace or update a page once it has been indexed. Therefore, what is needed in the art are systems and methods for crawling and indexing web pages to reduce the latency between the time when a web page is either posted or updated on the Internet and the time when a representation of the new or updated web page is indexed and made available to a search engine.

Given the above background, it is desirable to devise a system and method for assigning document identification tags to documents to be indexed before retrieval of the entire contents of a collection of documents is complete. Furthermore, it is desirable to devise systems and methods for assigning document identification tags before a crawl is complete in such a way that the document identification tags encode information about the query-independent relevance of the document relative to the collection of documents.

SUMMARY

Embodiments provide a method of assigning a document identification tag to a new document. The new document is to be added to a collection of documents. First, the method subdivides a set of document identification tags into a plurality of tiers. Each tier is associated with a respective subset of the set of document identification tags. Next, query-independent information about the new document, including a query-independent metric, is received. Next, based at least on the query-independent information, one of the tiers is selected. Finally, the new document is assigned a document identification tag from the respective subset of document identification tags associated with the selected tier, the assigned document identification tag not previously assigned to any of the documents in the collection of documents.

In some embodiments, each tier in the plurality of tiers is associated with a respective predetermined range of metric values. In these embodiments, selecting a tier includes selecting the tier for which the query-independent metric of the new document falls within the respective predetermined range of metric values associated with the selected tier. In some of these embodiments, the plurality of tiers are ordered so that the respective subsets of the set of document identification tags associated with each tier monotonically increases with the position of the tier in the ordering and the respective predetermined range of metric values associated with each tier monotonically increases with the position of the tier in the ordering. In some embodiments, assigning a document identification tag to the new document includes assigning to the new document a minimum available document identification tag from the respective subset of document identification tags associated with the selected tier. In other embodiments, assigning a document identification tag to the new document includes assigning to the new document a maximum available document identification tag from the respective subset document identification tags associated with the selected tier.

In some embodiments, when a flush condition is satisfied, a flush operation is performed. The flush operation includes building a sorted map, the sorted map relating globally unique identifiers to document identification tags assigned to documents since a prior flush operation. In some embodiments, when a merge condition is satisfied, a merge operation is performed. The merge operation includes merging a plurality of sorted maps produced by previous flushing operations, producing a merged map relating globally unique identifiers to document identification tags assigned to documents.

In some embodiments, the flush operation includes building a first sorted map and a second sorted map. The first sorted map is keyed and sorted by globally unique identifiers, and includes for each globally unique identifier a corresponding document identification tag. The second sorted map is keyed and sorted by document identification tags assigned to documents since a prior flush operation, and includes for each such document identification tag a corresponding globally unique identifier.

Another aspect of the invention partitions a set of valid globally unique document identifiers into a plurality of segments, each segment associated with a respective subset of the set of valid globally unique document identifiers. Each of the segments is subdivided into a plurality of tiers, each segment having an associated set of document identification tags, and each tier of a respective segment having an associated subset of the set of document identification tags for the respective segment. Embodiments in accordance with this aspect receive query-independent information about a new document, including a query-independent metric and a globally unique document identifier. Then, based at least in part on the globally unique document identifier, one of the segments is selected. Next, based at least on the query-independent information, one of the tiers associated with the selected segment is selected. Finally, the new document is assigned a document identification tag from the subset of document identification tags associated with the selected tier. The receiving, selecting a segment, selecting a tier, and assigning is repeated with respect to one or more additional new documents. The set of document identification tags for each respective segment have the property that none of the tags therein are assigned to documents that have globally unique document identifiers associated with the respective segment.

Another aspect partitions a set of valid globally unique document identifiers into a plurality of segments, each segment associated with a respective subset of the set of valid globally unique document identifiers. Each of the plurality segments is further partitioned into a respective set of partitions, each partition associated with a respective range of the subset of globally unique document identifiers associated with the segment. Embodiments in accordance with this aspect subdivide each of the partitions into a plurality of tiers, each partition having an associated set of document identification tags, and each tier of a respective partition having an associated subset of the set of document identification tags for the respective partition. A server responsible for assigning document identification tabs receives query-independent information about a new document, including a query-independent metric and a globally unique document identifier. In one embodiment, the globally unique document identifier is a fixed length fingerprint of the documents' address or URL. Based at least in part on the globally unique document identifier, one of the segments and one of the partitions is selected. In addition, based at least on the query-independent information, one of the tiers associated with the selected partition is selected. The new document is assigned a document identification tag from a subset of document identification tags associated with the selected tier. The receiving, selecting a segment and a partition, selecting a tier, and assigning steps or operations are repeated with respect to one or more additional new documents.

Another aspect provides a system for assigning a document identification tag to a new document. The system includes a data structure representing a subdivision of a set of document identification tags into a plurality of tiers, wherein each tier is associated with a respective subset of the set of document identification tags. An interface is configured to receive query-independent information about the new document, the information including a query-independent metric. The system further includes a tag assignment module configured to (1) select, based at least on the query-independent information, one of the tiers and (2) assign to the new document a document identification tag from the respective subset of document identification tags associated with the selected tier, the assigned document identification tag not previously assigned to any of the documents in the collection of documents.

Another aspect provides a computer program product for use in conjunction with a computer system, the computer program product comprising a computer readable storage medium and a computer program mechanism therein. The computer program mechanism comprises:

a data structure representing a subdivision of a set of document identification tags into a plurality of tiers, wherein each tier is associated with a respective subset of the set of document identification tags;

an interface configured to receive query-independent information about a new document, the information including a query-independent metric; and a tag assignment module including instructions for selecting, based at least on the query-independent information, one of the tiers, and for assigning to the new document a document identification tag from the respective subset of document identification tags associated with the selected tier, the assigned document identification tag not previously assigned to any of the documents in a collection of documents.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

FIGS. 5A-5D respectively illustrate data structures for a link log, an Rtlog, a history log, and a status log.

Like reference numerals refer to corresponding parts throughout the several views of the drawings.

DETAILED DESCRIPTION OF EMBODIMENTS

Systems and methods for crawling and indexing web pages are described below. Advantageously, these systems and methods reduce the latency between the time when a web page is posted or updated on the Internet and the time when a representation of the new or updated web page is indexed and made available to a search engine.

In particular, systems and methods for assigning document identification tags to documents to be added to an index of web pages are described below. Advantageously, these systems and methods are capable of assigning document identification tags before all of the documents to be added to the index have been crawled, while still assigning document identification tags so that lists of documents emerge from the index approximately ordered by decreasing query-independent relevance.

Figure 1:
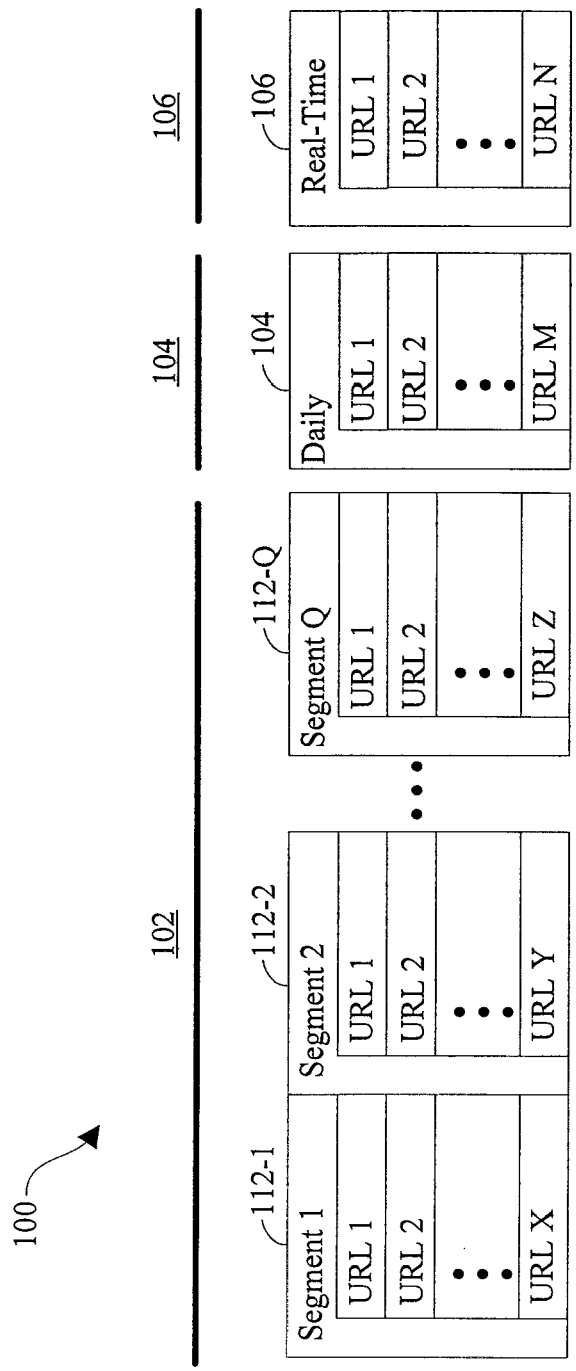
FIG. 1 illustrates a data structure for storing uniform resource locators (URLs).

Data structure for storing URLs. Referring to FIG. 1, a three-layer data structure 100 is illustrated. Base layer 102 of data structure 100 comprises a sequence of segments 112. In one embodiment, each segment 112 comprises more than two hundred million uniform resource locations (URLs). Together, segments 112 represent a substantial percentage of the addressable URLs in the entire Internet.

Periodically (e.g., daily) one of the segments 112 is deployed for crawling purposes, as described in more detail below. In addition to segments 112, there exists a daily crawl layer 104. In one embodiment, daily crawl layer 104 comprises more than fifty million URLs. Daily crawl layer 104 comprises the URLs that are to be crawled more frequently than the URLs in segments 112. In addition, daily crawl layer 104 comprises high priority URLs that are discovered by system 200 during a current epoch.

In some embodiments, data structure 100 further comprises an optional real-time layer 106. In some embodiments, optional real-time layer 106 comprises more than five million URLs. The URLs in real-time layer 106 are those URLs that are to be crawled multiple times during a given epoch (e.g., multiple times per day). For example, in some embodiments, the URLs in optional real-time layer 106 are crawled every few minutes. Real-time layer 106 also comprises newly discovered URLs that have not been crawled but should be crawled as soon as possible.

Figure 2:
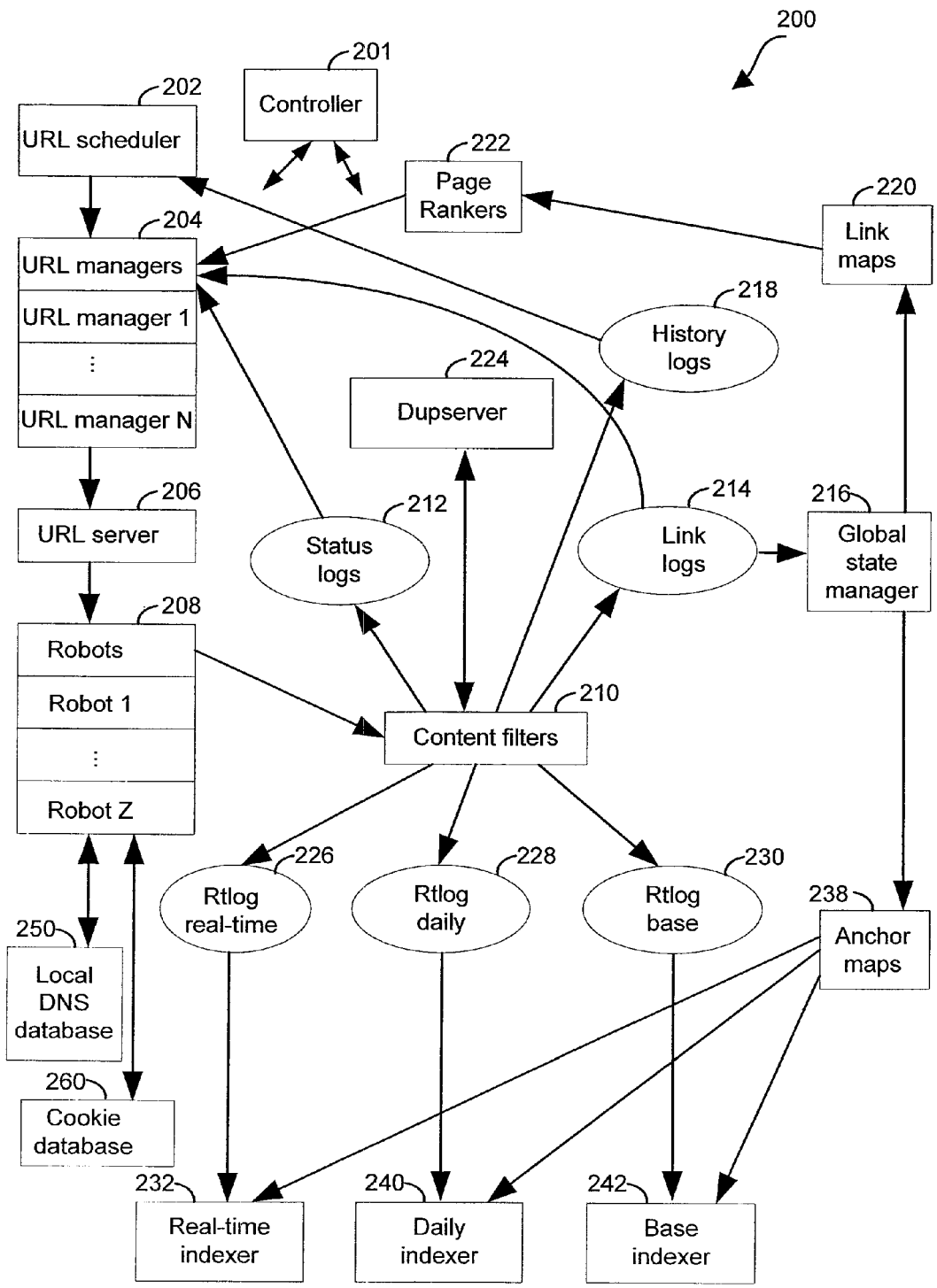
FIG. 2 illustrates a web crawler system for processing crawled web pages.

The URLs in layers 102, 104, and 106 are all crawled by the same robots 208 (FIG. 2). However, the results of the crawl are placed in indexes that correspond to layers 102, 104, and 106 as illustrated in FIG. 2 and described in more detail below. Layers 102, 104, and 106 are populated by a URL scheduler based on the historical (or expected) frequency of change of the content of the web pages at the URLs and a measure of URL importance, as described in more detail below.

URL Discovery. There are a number of different sources for the URLs used to populate data structure 100. One source of URLs is the direct submission of URLs by users to the search engine system. Another source of URLs is through discovery of outgoing links on crawled pages. A third source of URLs is through submissions (e.g., time-based submissions) from third parties who have agreed to provide content. For example, such third parties can give links as they are published, updated, or changed.

Automated time-based submissions are made possible using technologies such as RDF Site Summary (RSS) and Resource Description Framework (RDF). RSS is a protocol, an application of XML, that provides an open method of syndicating and aggregating Web content. Using RSS files, a data feed can be created that supplies headlines, links, and article summaries from a Web site. RDF is a syntax for specifying metadata.

Before storage in data structure 100, a URL (and the content of the corresponding page) is processed by a series of modules that are designed to ensure content uniformity and to prevent the indexing of duplicate pages. For example, one such process is a URL rewrite module. The URL rewrite module strips or rewrites commands in URL statements that would produce undesirable output. For example, if a URL includes a statement that inhibits output of a certain column, the statement is stripped from the URL. In addition to examining the syntax of specific URLs, there is a host duplicate detection module. The host duplicate detection module attempts to determine which hosts are complete duplicates of each other by examining incoming URLs.

Figure 3A:
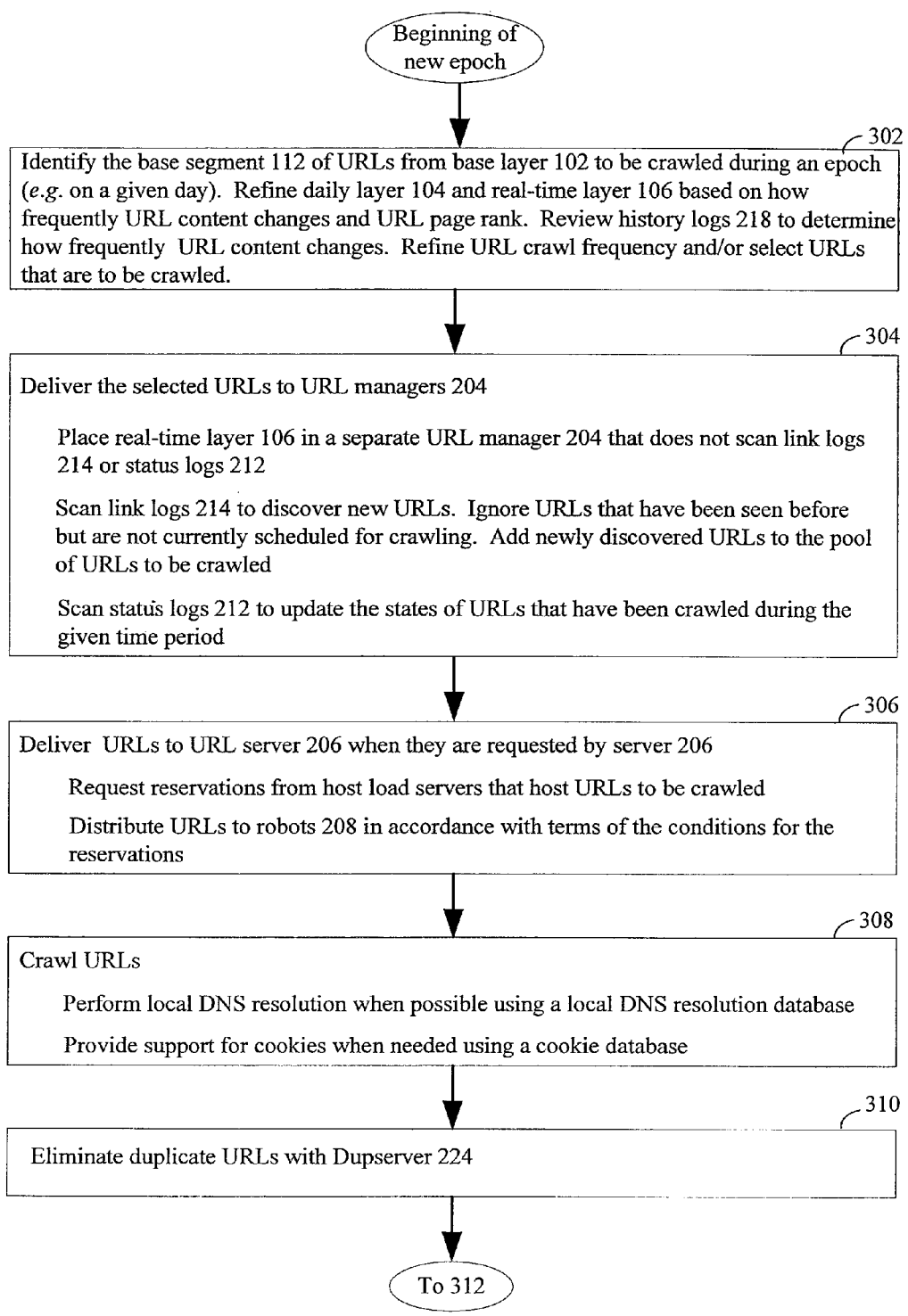
FIGS. 3A-3B illustrate a method of web crawling.
Figure 3B:
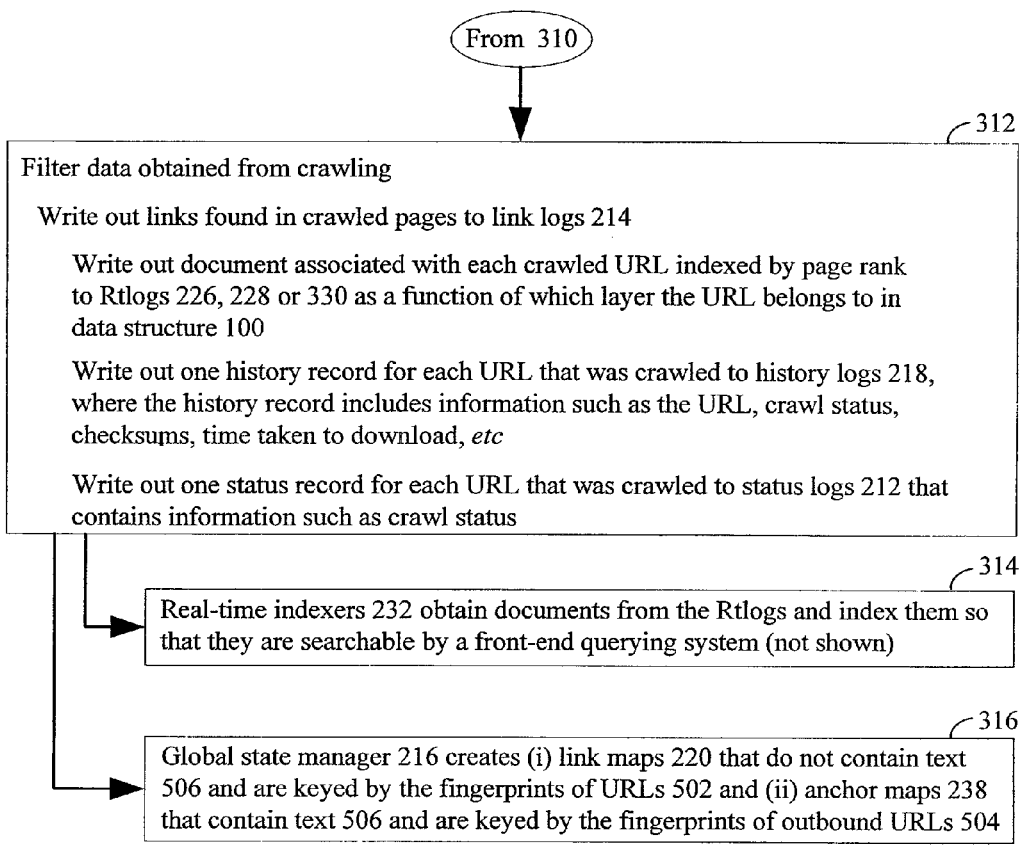

Exemplary methods. An exemplary system 200 and method by which the URLs in data structure 100 (FIG. 1) are crawled is respectively illustrated in FIGS. 2 and 3. The exemplary method illustrated in FIGS. 3A and 3B describes events that take place during a predetermined time period, termed an epoch. Each time an epoch elapses, a new epoch is initiated by re-executing steps 302 and 304 of the process illustrated in FIGS. 3A and 3B. An epoch can be set to any length of time. In one embodiment, an epoch is one day.

Step 302. In step 302 URL scheduler 202 determines which URLs will be crawled in each epoch, and stores that information in data structure 100. Controller 201 selects a segment 112 from base layer 102 for crawling. The selected segment 112 is referred to herein as the "active segment." Typically, at the start of each epoch, controller 201 selects a different segment 112 from base layer 102 as the active segment so that, over the course of several epochs, all the segments 112 are selected for crawling in a round-robin style.

URL scheduler 202 revises daily layer 104 and optional real-time layer 106 by moving URLs to layers 104 and 106 from base layer 102 or vice versa. The decision as to whether to add or remove URLs from daily layer 104 and real-time layer 106 is based on information in history logs 218 that indicates how frequently the content associated with the URLs is changing as well as individual URL page ranks that are set by page rankers 222. In some embodiments, the determination as to what URLs are placed in layers 104 and 106, as opposed to layer 102, is made by computing a daily score of the form:

$$\text{daily score} = [\text{page rank}]^2 * \text{URL change frequency}$$

The mechanism by which URL scheduler 202 obtains URL change frequency data is best understood by reviewing FIG. 2. When a URL is accessed by a robot 208, the information is passed through content filters 210. Content filters 210, among other things, determine whether a URL has changed and when a URL was last accessed by a robot 208. This information is placed in history logs 218, which are passed back to URL scheduler 202. By reviewing the log records for a particular URL, each of which indicates whether the content of a URL changed since the immediately previous time the URL was crawled, the URL schedule 202 (or other module) can compute a URL change frequency. This technique is particularly useful for identifying URL's whose content (i.e., the content of the page at the URL) changes very infrequently, or perhaps not at all. Furthermore, the computation of a URL change frequency can include using supplemental information about the URL. For instance, the URL scheduler 202 may maintain or access information about web sites (i.e., URL's) whose content is known to change quickly.

A query-independent score (also called a document score) is computed for each URL by URL page rankers 222. Page rankers 222 compute a page rank for a given URL by considering not only the number of URLs that reference a given URL but also the page rank of such referencing URLs. Page rank data can be obtained from URL managers 204. A more complete explanation of the computation of page rank is found in U.S. Pat. No. 6,285,999, which is hereby incorporated by reference as background information.

URL history log 218 can contain URLs that are not found in data structure 100. For instance, the URL history log 218 may contain log records for URL's that no longer exist. The URL history log 218 may also contain log records for URL's that exist but that which the URL scheduler 202 will no longer schedule for crawling (e.g., due to a request by the website owner that the URL not be crawled, due to objectionable content, or for any other reasons).

In cases where URL scheduler 202 determines that a URL should be placed in a segment 112 of base layer 102, an effort is made to ensure that the placement of the URL into a given segment 112 of base layer 102 is random (or pseudo-random), so that the URLs to be crawled are evenly distributed (or approximately evenly distributed) over the segments. In some embodiments, the fingerprint of the URL is used to achieve the random selection of a segment 112 to place the URL. A fingerprint is, for example, a 64-bit number (or a value of some other predetermined bit length) that is generated from the corresponding URL by first normalizing the URL text (for example, converting host names to lower case) and then passing the normalized URL through a fingerprinting function that is similar to a hash function with the exception that the fingerprint function guarantees that the fingerprints are well distributed across the entire space of possible numbers. In some embodiments, the fingerprint modulus N, where N is the number of segments 112 in base layer 102 (e.g. "fingerprint modulus 12", in the case where there are 12 segments 112 in base layer 102) is used to select the segment 112 in which to place a given URL. In some embodiments, additional rules are used to partition URLs into a segment 112 of base layer 102, daily layer 104, and real-time layer 106.

In some embodiments, it is not possible to crawl all the URLs in an active segment 112, daily layer 104, and real-time layer 106 during a given epoch. In one embodiment, this problem is addressed using two different approaches. In the first approach, a crawl score is computed for each URL in active segment 112, daily layer 104, and real-time layer 106. Only those URLs that receive a high crawl score (e.g., above a threshold value) are passed on to the next stage (URL managers 204, FIG. 2). In the second approach, URL scheduler 202 refines an optimum crawl frequency for each such URL and passes the crawl frequency information on to URL managers 204. The crawl frequency information is then ultimately used by URL managers 204 to decide which URLs to crawl. These two approaches are not mutually exclusive and a combined methodology for prioritizing the URLs to crawl (based on both the crawl score and the optimum crawl frequency) may be used.

In embodiments where a crawl score is computed, URL scheduler 202 determines which URLs will be crawled on the Internet during the epoch by computing a crawl score for each URL. Those URLs that receive a high crawl score (e.g., above a predefined threshold) are passed on to the next stage (URL managers 204) whereas those URLs that receive a low crawl score (e.g., below the predefined threshold) are not passed on to the next stage during the given epoch. There are many different factors that can be used to compute a crawl score including the current location of the URL (active segment 112, daily segment 104 or real-time segment 106), URL page rank, and URL crawl history. URL crawl history is obtained from URL history logs 218. Although many possible crawl scores are possible, in one embodiment the crawl score is computed as:

crawl score=[page rank]*(change frequency)*(time since last crawl).

Additionally, many modifications to the crawl score, including cutoffs and weights, are possible. For example, the crawl score of URLs that have not been crawled in a relatively long period of time can be upweighted so that the minimum refresh time for a URL is a predetermined period of time, such as two months.

In embodiments where crawl frequency is used, URL scheduler 202 sets and refines a URL crawl frequency for each URL in data structure 100. URL crawl frequency for a given URL represents the optimum crawl frequency (or, more generally, a selected or computed crawl frequency) for a URL. The crawl frequency for URLs in daily layer 104 and real-time layer 106 will tend to be shorter than the crawl frequency of URLs in base layer 102. Crawl frequency for any given URL can range from a minute or less to a time period that is on the order of months. In one embodiment, the optimal crawl frequency for a URL is computed based on the historical change frequency of the URL and the page rank of the URL.

In addition to other responsibilities, URL scheduler 202 determines which URLs are deleted from data structure 100 and therefore dropped from system 200. URLs are removed from data structure 100 to make room for new URLs that are to be added to data structure 100. In some embodiments, a "keep score" is computed for each URL in data structure 200. The URLs are then sorted by this "keep score" and URLs that receive a low "keep score" are eliminated as newly discovered URLs are added to data structure 100. In some embodiments, the "keep score" is the page rank of a URL that is determined by page rankers 222 (FIG. 2).

Step 304. In step 304, URL managers 204 receive the active segment as well as layers 104 and 106 from URL scheduler 202. In typical embodiments, because of the computational demands imposed upon URL managers 204, each manager 204 is resident on its own dedicated server. Further, in some embodiments, real-time layer 106 is managed by a separate URL manager 204 that holds all or a substantial portion of layer 106 in high speed random access memory. The active segment and daily layers are partitioned into the remaining URL managers 204. Typically, this partitioning is performed using a modulo function or similar function on the fingerprint values (or a portion of a fingerprint value) derived from each URL in the active segment and daily layers so as to partition these URLs into a set of approximately equal sets (partitions). Each of these sets is assigned to a different URL manager 204 of a plurality of URL managers 204.

In some embodiments, data structure 100 is partitioned and stored in a plurality of servers. In such embodiments, this plurality of servers is represented by URL scheduler 202. URLs that are copied from the URL scheduler 202 servers are distributed to the servers hosting the URL managers 204 on a random basis. Further, the number of servers used by URL scheduler 202 and the number of servers that host URL managers 204 are constrained such that they are relatively primed. That is, there is no common divider between (i) the number of servers used by URL scheduler 202 and (ii) the number of servers hosting URL managers 204. One example of a relatively primed topology is the case in which URL scheduler 202 is partitioned across 11 servers and there are 13 servers for the URL managers 204.

When the number of servers between two stages of system 200 (FIG. 2) is relatively primed, a modulo function can be used to randomly distribute URLs to servers in the next stage. For example, in one embodiment, the fingerprint of each URL that is be copied from URL scheduler 202 to URL manager 204 is obtained. Next, a modulus of the fingerprint (or the modulus of a portion of the fingerprint or of a function of the fingerprint) is taken. Specifically, the modulus that is taken of the fingerprint is the number of possible destination servers. Thus, in the example where URL scheduler 202 is partitioned across 11 servers and there are 13 servers for URL managers 204, then modulus 13 of the URL fingerprint of a respective URL is used to determine which of the 13 servers the respective URL will be sent.

As discussed above, in some embodiments, real-time layer 106 is managed by a separate URL manager 204 that holds all or a substantial portion of the real-time layer in high speed random access memory. Thus, in some embodiments, the (i) number of servers that host URLs other than those from real-time layer 106 and (ii) number of servers that host portions of data structure 100, other than real-time layer 106, are relatively primed (e.g., 11 and 13).

The use of constrained numbers of servers is used in various stages of system 200 (FIG. 2). For example, in some embodiments, the number of DupServers 224, global state managers 216, indexers 232, 240 and 242, and page rankers 222 is constrained so that they are hosted by relatively primed numbers of servers. Advantages of such a randomization scheme are at least two-fold. First, this scheme reduces the complexity of the computer code required to ensure random distribution of URLs across a plurality of servers at a given stage of system 200. Rather than relying on complex randomization schemes, all that is required is computation of the a URL fingerprint (or a portion of the URL fingerprint) modulus the number of servers in the next stage. Second, the randomization itself ensures that, if a server fails at any stage of system 200, the data that is not processed due to the failure represents a randomized sample of the URLs in data structure 100, rather than a complete category of URLs. Such randomization, therefore, reduces the affect that individual server failure has on system 200. When a server fails, isolated URLs from across data structure 100 may not get indexed or updated during a given epoch. The impact of a server failure on users of the search engine is less noticeable when the impacted URLs are randomized than when whole categories of URLs are impacted (e.g., not indexed) by a failure of a server in system 200. Thus, the process illustrated in FIGS. 3A and 3B can progress even when a server at any given stage is working slower than other servers at the same stage or is, in fact, down altogether.

Figure 4:
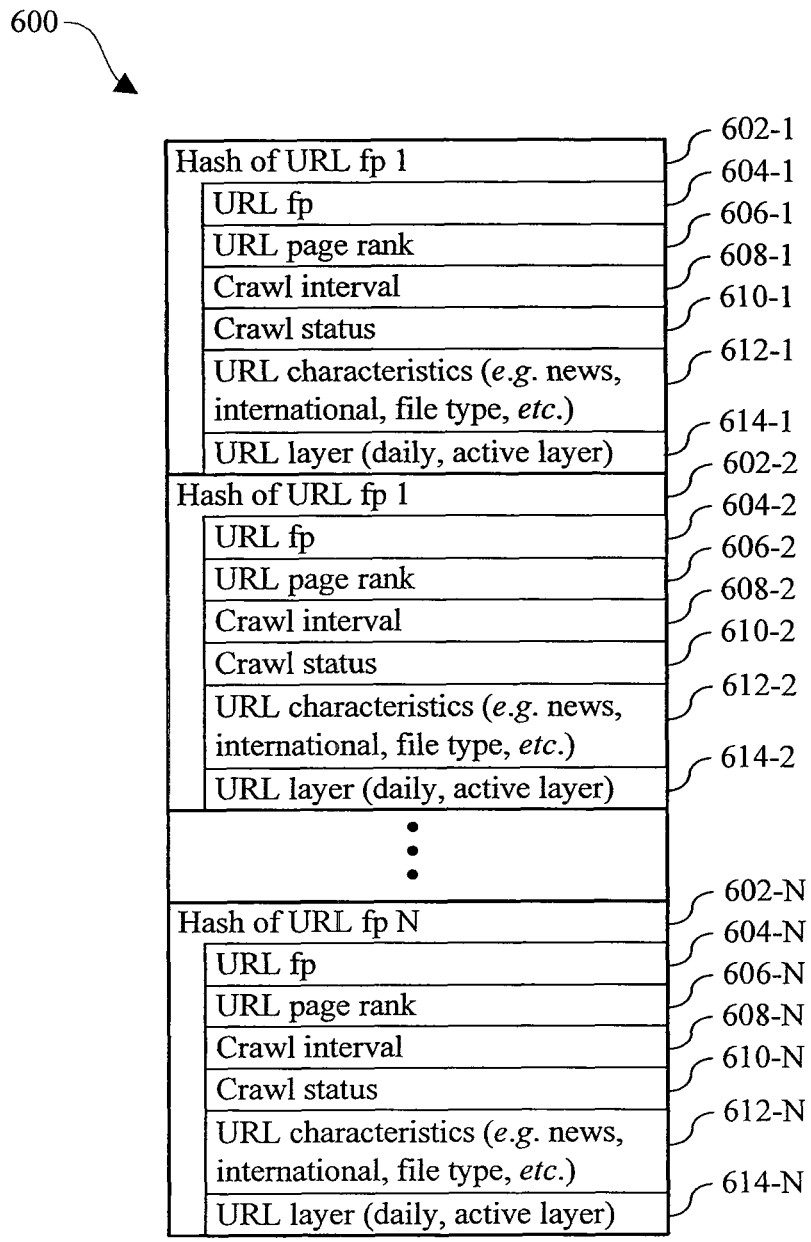
FIG. 4 illustrates a hash table for storing state information about URLs that are queued to be crawled.

In FIG. 4, state information for URLs is stored in a hash table 600. Each URL manager 204 stores information about the URLs that have been assigned to the URL manager in the hash table 600 (FIG. 4), which is stored in random access memory. The normalized hash 602 of the URL fingerprint 604 serves as the index to the table 600.

The storage of URLs in hash tables 600 on each server hosted by a URL manager 204 is advantageous because it provides a way of quickly accessing URL state information. For example, to obtain state information for a particular URL, all that is required is to look up the record having the hash value that corresponds to the hash of the URL. Such a lookup process is more efficient than searching through records of all the URLs held by all the URL managers 204 for a desired URL.

Representative URL state information stored in hash tables 600 includes the URL's fingerprint (called the URL fingerprint) 604, URL page rank 606, and the layer (102, 104, or 106) to which the URL belongs. In some embodiments, URL page rank 606 is not stored in hash table 600 but is stored in a data structure that is available to each URL manager 204. A wide range of additional URL state information can be stored in hash table, including information that is obtained from or derived from status logs, history logs, page rankers. Representative state information that can be stored in hash tables 600 is described below.

Each of the URL managers 204, other than the URL manager 204 that hosts real-time layer 106, perform a variety of functions. For instance, they scan link logs 214 to discover new URLs. Link logs 214 comprise all the links that are found on scanned web pages during the current epoch. URLs that have been seen by system 200 before but have not been scheduled for crawl during the current epoch are ignored. Newly discovered URLs are added to a hash table 600 of a URL manager 204. The hash table data structure provides an advantageous mechanism for quickly determining whether a table 600 contains a URL discovered in a link log. Rather than scanning large lists of URLs to determine whether a URL in a link log is new, the URL from the link log is simply hashed and a search is made for the resultant hash value in each hash table 600. If a URL is found in a link log 214 and is not in any hash table 600, it is added to the hash table 600 of one of the URL managers 204.

Referring to FIG. 2, URL managers 204 scan status logs 212 in order to update the state of URLs that have been delivered to URL server 206 to be crawled. The URL server 206 distributes the URLs to be crawled among the robot crawlers 208. Status logs 212 are sequential logs that are generated by content filters 210. Content filters 210 receive content (i.e., retrieved documents) from the robot crawlers 208. Status logs 212 include the status of URLs that have been handed to URL server 206 by URL manager 204 during the current epoch. Status logs 212 indicate whether a URL was successfully crawled by a robot. If the status for a URL says "crawled" then a URL manager 204 knows that the URL has been crawled and work with the URL is finished until the crawl period for that URL has elapsed. Crawl status is stored in field 610 in the exemplary hash table 600 illustrated in FIG. 4. Likewise, if status log 212 returns a "HTTP 404" value, indicating that the URL does not exist, then the URL manager 204 knows that work with the URL is complete, at least until the next crawl period. Alternatively, if status log 212 does not include a record of the URL or indicates that that the URL was busy when the web crawler 208 (robot; FIG. 2) attempted to access the URL, than URL manager 204 reschedules the URL for crawling. Still further, if a status log 212 indicates that content filter 210 has deleted the URL, the URL manager 202 removes the URL from the respective hash table 600 and the URL is no longer crawled.

In some embodiments, the number of URLs hosted by URL managers 204 exceeds the number of URLs than can be crawled during a given epoch and/or there is a risk that URLs hosted by URL managers 204 will be crawled on an infrequent basis during a given epoch. In such embodiments, the URL status information maintained for URLs by URL managers 204 can be used to ensure that, to the extent possible, the URLs matching select criteria are given high priority for crawling. In other words, URL state information can be used to prioritize which URLs will be sent to URL server 206. Several different factors can be used to accomplish this prioritization, such as URL crawl interval 608 and URL page rank 606, to name a few. URL managers 204 obtain the page rank of URLs from page rankers 222. Page rankers 222 maintain a persistent record of the page rank of URLs and actively update the page rank of URLs using link maps 220 as described in more detail below. Crawl interval 608 represents a target frequency that a URL should be crawled. For example, if a URL has a crawl interval 608 of two hours, the URL manager will attempt to crawl the URL every two hours. Any number of criteria to be used to prioritize which URLs will be delivered upon request to URL server 206, including "URL characteristics" 612 such as the category of the URL. Representative URL categories include, but are not limited to news URLs, international URLs, language categories (e.g., French, German, Japanese, etc.), and file type categories (e.g., postscript, powerpoint, pdf, html). The URL characteristics 612 for a URL may identify a plurality of URL categories to which the URL belongs.

Step 306. Periodically, URL server 206 makes requests from URL managers 204 for URLs. In response, URL managers 204 provide URL server 206 with URLs. In some embodiments, URL server 206 requests specific types of URLs from URL managers 204 based on a policy (e.g., eighty percent foreign URLs/twenty percent news URLs) that URL server 206 is enforcing. URL managers 204 are able to service such requests because of the URL state information they store for each URL in hash tables 600. Additionally, URL server 206 attempts to ensure that each URL manager 204 contributes URL requests.

URL server 206 distributes URLs from URL managers 204 to robots 208 to be crawled. Conceptually, a robot 208 is a program that automatically traverses the Web's hypertext structure by retrieving a document at a URL, and recursively retrieving all documents that are referenced by the retrieved document. The term "recursive" as used here is not limited to any specific traversal algorithm. However, in a system that retrieves indexes billions of documents, this simple recursive methodology is not workable. Instead, each robot 208 crawls the documents assigned to it by the URL server 206. The robot passes retrieved documents to the content filters 210, which process the links in the downloaded pages, from which the URL scheduler 202 determines which pages are to be crawled. Robots 208 are unlike normal web browsers, such as Internet Explorer (Microsoft, Redmond Wash.). For instance, when a robot retrieves the document at a URL, it does not automatically retrieve content (e.g., images) embedded in the document through the use of object or other tags. Also, in one embodiment, the robots are configured to not follow "permanent redirects". Thus, when a robot encounters a URL that is permanently redirected to another URL, the robot does not automatically retrieve the document at the target address of the permanent redirect.

In some instances, URL server 206 avoids overloading any particular target server (not shown) that is accessed by the robots 208. The URL server 206 determines the maximum number of URL requests to be sent to any particular host. It does this by making a procedure call to a server called the host load server (not shown). The host load server stores information for each known host server (i.e., a server storing documents known to the search engine) indicating the maximum request load to be imposed by entire search engine on the host server number, and the portion of that load which is currently in use or reserved by robots. The URL server 206 sends a load reservation request to the host load server, requesting the right to send download requests to a specified host server, and receives back an indication of the number of download requests that the URL server can allocate to a robot. In other words, the URL server will be told how many URLs the URL server can send to a robot for downloading. Then, URL server 206 parcels out the proper number of URLs to robots in accordance with the load reservation granted to the URL server 206 by the host load server. The robots 208 take these URLs and download (or at least attempts to download) the documents at those URLs. When URL server 206 runs out of URLs to process, it requests more URLs from URL managers 204. Furthermore, when a robot completes the process of downloading the set of URLs it received from the URL server, the host load reservations made by the URL server are released. Alternately, host load reservations are made for a fixed period of time, and are automatically released upon the expiration of that fixed period of time.

Step 308. In step 308, a plurality of robots 208 crawl URLs that are provided to the robots 208 by URL server 206. In some embodiments, robots 208 use a calling process that requires domain name system (DNS) resolution. DNS resolution is the process by which host names (URLs) are resolved into their Internet Protocol (IP) addresses using a database that provides a mapping between host names (URLs) and IP addresses. In some embodiments, enhancements to known DNS resolution schemes are provided in order to prevent DNS resolution from becoming a bottleneck to the web crawling process, in which hundreds of millions of URLs must be resolved in a matter of hours. One of these enhancements is the use of a dedicated local database 250 (FIG. 2) that stores the IP addresses for URLs that have been crawled by system 200 in the past, which reduces the system's reliance on DNS servers on the Internet. This allows URLs that have been previously crawled by system 200 to be pre-resolved with respect to DNS resolution. The use of a local DNS resolution database 250 enables a high percentage of the system's DNS resolution operations to be handled locally, at very high speed. Only those URLs that are not represented on local DNS database 250 (e.g., because they have not been previously crawled) are resolved using conventional DNS resources of the Internet. As a result, the IP addresses of URLs are readily accessible when they are needed by a robot 208. Also, the system presents a much lower load on the DNS servers that would otherwise be needed to perform DNS resolution on every URL to be crawled.

Robots 208 use various protocols to download pages associated with URLs (e.g., HTTP, HTTPS, gopher, File Transfer Protocol, etc.). Robots 208 do not follow permanent redirects that are found at URLs that they have been requested to crawl. Rather they send the source and target (i.e., redirect) URLs of the redirect to the content filters 210. Referring to FIG. 2, content filters 210 take the redirect URLs and place them in link logs 214 where they are passed back to URL managers 204. The URL managers 204, in turn, determine when and if such redirect URLs will be assigned to a robot 208 for crawling. Robots 208 do follow temporary redirects and obtain page information from the temporary redirects.

Step 310. Pages obtained from URLs that have been crawled by robots 208 are delivered to the content filters 210. In typical embodiments, there is more than one content filter 210 in system 200 because of the computational demands of the content filter 210. In step 310, content filter 210 sends information about each retrieved page to DupServer 224 to determine if the document is a duplicate of other pages. In one embodiment, the information sent to the DupServer 224 about each page includes the URL fingerprint of the page, the content fingerprint of the page, the page's page rank, and an indicator as to whether the page is source for a temporary or permanent redirect. When a duplicate is found, the page rankings of the duplicate pages (at other URLs) are compared and the "canonical" page for the set of duplicate pages is identified. If the page presented to the DupServer 224 is not the canonical page (of the set of duplicate pages), the content filter 210 does not forward the page (to the respective RTlog 226, 228, 230) for indexing. Rather, the content filter 210 makes an entry for the page in the history log 218, creates or updates an entry for the URL in the status log 212, and then ceases work on the page. In effect, a non-canonical page is deleted from the search engine, except for the entries in the history log and status log. In addition to identifying duplicate web pages, DupServer 224 assists in the handling of both temporary and permanent redirects encountered by the robots 208.

Examples of stages where the number of servers used to host the stage is constrained have been described. For, example, the number of servers used to host data structure 100 is constrained relative to the number of servers used to host URL managers 204 such that they are relatively primed. However, there are examples in system 200 in which the number of servers used to host a stage is not constrained such that it is relatively primed with respect to the number of servers used to host a prior or subsequent stage. The number of servers used to host content filters 210 represents one such example. In other words, the number of servers used to host content filters 210 is not constrained such that it is relatively primed with respect to the number of robots 208. In fact, in some embodiments, the number of servers used to host content filters 210 is a multiple of the number of servers used to host robots 208.

Step 312. In the embodiment illustrated in FIGS. 2 and 3A-3B, the content filters write out four types of log files, link logs 214, RTlogs (226, 228, or 230), history logs 218, and status logs 212. With the exception of those URLs that have been flagged as not being canonical pages (i.e., not suitable for indexing) by the DupServer 224, URLs that have been crawled by robots 208 are processed as described below. For those URLs that have been flagged as not suitable for indexing, content filter 210 will insert corresponding records in all RTlogs, the appropriate link log 214, and the history logs 218.

Referring to FIG. 5A, a link log 214 contains one link record 502 per URL document. A URL document is a document obtained from a URL by a robot 208 and passed to content filter 210. Each record 502 lists the URL fingerprints 504 of all the links (URLs) that are found in the URL document associated with a record 502 as well as the text 506 that surrounds the link. For example, text 506 can state "to see a picture of Mount Everest click here", where the page identified by the link represents an image of Mount Everest. In one embodiment, link log 214 is partitioned or segmented across multiple servers, typically using a modulo function or similar function on a fingerprint value (or a portion of a fingerprint value) associated with the URL so as to partition records 502 across a plurality of servers so that content filter 210 can append to the link logs 214 at a very high bandwidth.

Referring to FIG. 5B, an RTlog stores the documents 512 obtained by robots 208. Each RTlog record 510 includes the content 512 of the document, the page rank 514 was assigned to the source URL of the document, the URL fingerprint 516 of the document. The record 510 may optionally include a list of URL fingerprints of duplicate documents having the same content. As illustrated in FIG. 2, there are three RTlogs, one for each layer in data structure 100. That is, there is an RTlog base 230 for the active segment 112 of base layer 102, an RTlog daily 228 for daily layer 104, and an RTlog real-time 226 for real-time layer 106. As in the case of link log 214, each RTlog is partitioned or segmented, typically using a modulo function or similar function on a fingerprint value (or a portion of a fingerprint value) associated with the source URL of each document 514 so as to partition the RTlog records 510 across a plurality of servers so that data can be written to and read from the RTlogs at a very high bandwidth.

Referring to FIG. 5C, a history log 218 comprises a record 520 for each URL 522 that has been crawled by a robot 208. As illustrated in FIG. 5C, there are a wide range of possible fields that can be included in each record 520. One field is crawl status 524. Crawl status 524 indicates whether the corresponding URL 522 has been successfully crawled. Other field is the content checksum 526, also known as the content fingerprint. When pages have identical content, they will also have the same content fingerprint 526. URL scheduler 202 can compare these content fingerprint with a previous content fingerprint obtained for the corresponding URL (identified by URL fingerprint 522 in the history log record 520) on a previous crawl to ascertain whether the web page has changed since the last crawl. Similarly, URL scheduler 202 can use link checksum 530 to determine whether any of the outbound links on the web page associated with the corresponding URL 522 have changed since the last crawl. Source 532 provides an indication of whether robot 208 accessed the URL using the Internet or an internal repository of URLs. "Time taken to download" 534 provides an indication of how long it took a robot 208 to download the web page associated with the corresponding URL in the last crawl. Error condition 536 records any errors that were encountered by a robot 208 during the crawl. An example of an error condition is "HTTP 404", which indicates that the web page does not exist.

Referring to FIG. 5D, the structure of a status log 212 in accordance with one embodiment is described. There is a record 550 for each URL that has been crawled by a robot 208. The record 550 records the full URL 552 associated with the record as well as a fingerprint 554 of the corresponding URL 552. In the embodiment illustrated in FIG. 5D, status log 212 further comprises crawl status 524 and content checksum 526, as described above in conjunction with FIG. 5C. Further, status log 212 comprises the outgoing links 556 that were identified in the web page associated with the URL 552 during the crawl. The outgoing links 556 comprise a list of the URL fingerprints of the URLs that are found in the web page. Further still, status log 212 has a duplicate status field 558 that stores information about whether DupServer 224 has identified the corresponding URL 552 as a duplicate (i.e., non-canonical) URL or not.

Step 314. In step 314, indexers 232, 240 and 242 obtain documents from the RTlogs on a high throughput basis, and generate indices for those documents. When the indices are provided to the servers of the front-end querying system (not shown), these documents become searchable by the users of the front-end querying system.

Step 316. In step 316, global state manager 216 reads link logs 214 and uses the information in the log files to create link maps 220 and anchor maps 238. Link maps 220 are keyed by the fingerprints of the source URLs in the link logs (i.e., the URLs that respectively correspond to each record 502). The records in link map 220 are similar to records 502 in link log 214 with the exception that text 506 is stripped and the records are keyed by the fingerprint of the normalized value of the source URL. Link maps are used by page rankers 222 to adjust the page rank of URLs within data structure 100. Such page rankings persists between epochs.

In addition to creating link maps 220, global state manager 216 creates anchor maps 238. In contrast to records in a link map 220, records in an anchor map 238 are keyed by the fingerprints of outbound URLs 504 present in link log 214 (FIG. 5A). Thus, each record in an anchor map 238 comprises the fingerprint of an outbound URL 504 and the text 506 that corresponds to the URL 504 in link log 214. Anchor maps 238 are used by indexer 232, 240 and 242 to facilitate the indexing of "anchor text" as well as to facilitate the indexing of URLs that do not contain words. For example, consider the case in which the target document at an outbound URL 504 is a picture of Mount Everest and there are no words in the target document. However, text 506 associated with the URL 504 states that "To see a picture of Mount Everest view this link." Text 506, although not in the target document at outbound URL 504, indicates that the outbound URL 504 has to do with "Mount Everest". Thus, indexers 232, 240 and 242 use anchor maps 238 to make associations between outbound URLs 504 and text 506. These associations are used to index outbound URLs for searching by users in a front-end search system (not shown).

Figure 6:
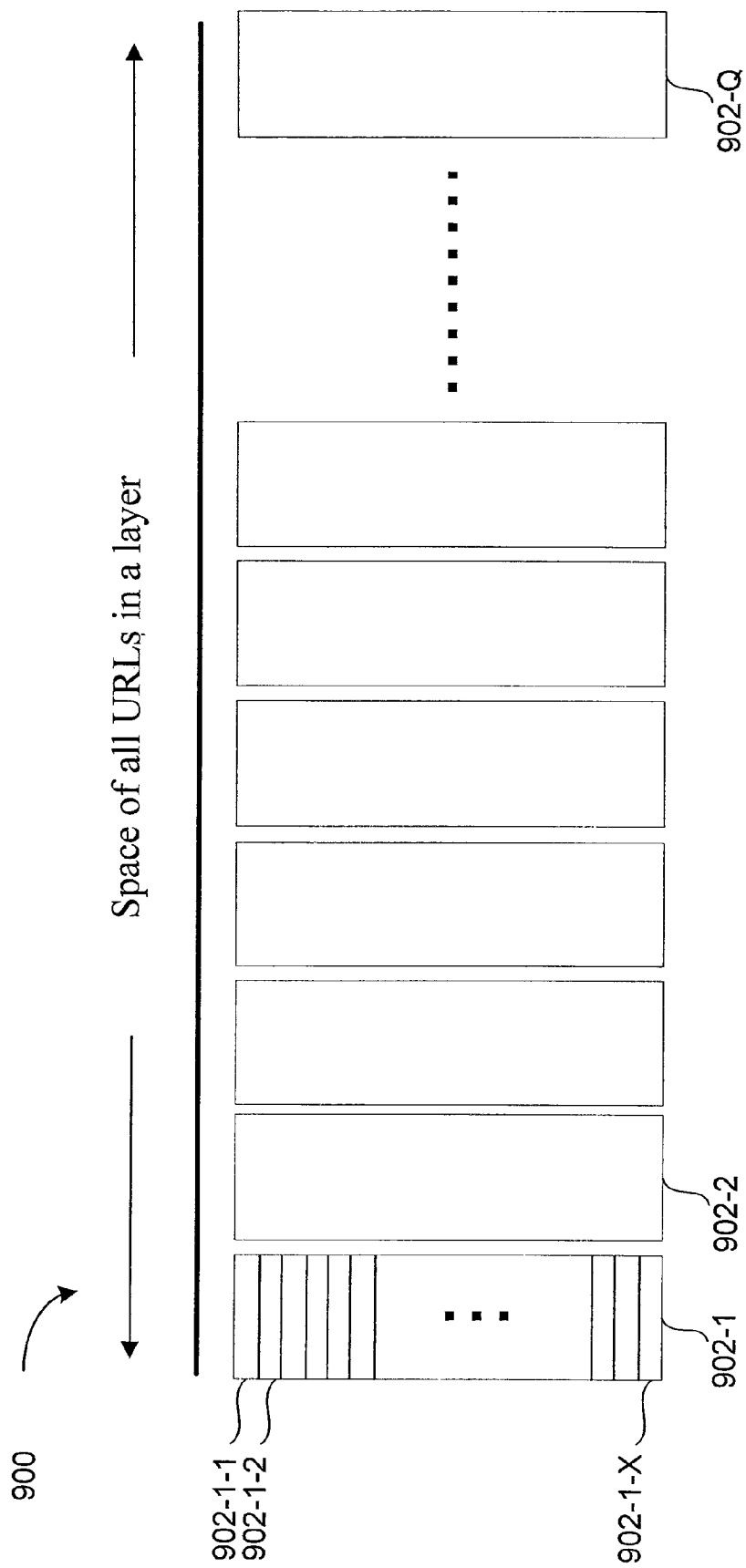
FIG. 6 illustrates the segmenting and partitioning of the space of uniform resource locators of documents to be indexed, preferably based on associated URL fingerprints.

Segments and partitions for crawling. Returning attention to the division of URLs used to schedule and perform crawling of the World Wide Web, FIG. 6 illustrates a segmented and partitioned set of uniform resource locators (URLs) in layer 900. Layer 900 is any one of base layer 102 (FIG. 1), daily crawl layer 104 (FIG. 1), or real-time layer 106 (FIG. 1). Layer 900 has associated with it a plurality of URLs. Crawling and indexing are performed in parallel and are scheduled according to the segmenting and partitioning of layer 900. When layer 900 is daily crawl layer 104 or real-time layer 106, the number of segments 902 is preferably one (Q=1). When layer 900 is base layer 102, the number Q of segments 902 is preferably between 4 and 100. In one embodiment, for instance, ten segments are used (Q=10). Each segment 902 comprises a subset of the URLs in layer 900. The subdivision of the URLs in layer 900 into segments 902 is based on a property of the URLs or, possibly, of the documents residing at the URLs. In a preferred embodiment, the subdivision is performed based on a URL fingerprint (also referred to as "URL FP" or simply as "FP") associated with the URL. A URL fingerprint is preferably a 64-bit integer determined by applying a hash function or other one way function to a URL. In one embodiment, each segment 902 is associated with a numerical range of URL fingerprints. Preferably, the ranges are mutually exclusive and collectively exhaustive, covering the entire space of possible URLs for the layer and associating a particular URL with one and only one segment. In another embodiment, the segment associated with each document is determined by applying a modulus function to all or a subset of the bits of the URL fingerprint of the document:

Segment *ID*=URL fingerprint modulo *Q*.

Each segment 902 in layer 900 may be further subdivided into one or more partitions. For example, in FIG. 6, segment 902-1 has been divided into X partitions 902-1-1, 902-1-2, . . . , 902-1-X. In much the same manner as the URLs in layer 900 are subdivided into segments, the URLs in segment 902-1 are allocated into partitions based on mutually exclusive and collectively exhaustive subsets of the respective ranges of URL FPs associated with segment 902-1. Alternately, the URLs in segment 902-1 are allocated into partitions using a modulus function. The modulus of the modulus function may be preferably relatively prime with respect to the modulus of the function used to subdivide the layer 900 into segments, or the modulus function used to allocate the segment into partitions may be based on a different subset of the bits of the URL fingerprint than the function used to allocate the URLs in layer 900 into segments.

Even when layer 900 is daily crawl layer 104 or real-time layer 106 and the number of segments 902 is one (Q=1), multiple partitions 902-1 are sometimes used. Segmenting and partitioning the URLs in layer 900 guides the tasks of parallelizing and scheduling the crawling and indexing of the URLs in layer 900. Partitioning and segmenting, however, are not essential to the teachings of the present disclosure.

Indexing crawled URLs. After one or more of the URLs in layer 900 have been crawled, and any non-canonical duplicate documents have been filtered out, the downloaded documents (which are stored in a log file, called the RTLog) are ready to be indexed. Downloaded documents are indexed shortly after each document is downloaded. The indexing of documents proceeds while other documents are being downloaded by the robot crawlers. Furthermore, as explained in more detail below, successful crawling of a URL (actual retrieval of the document that resides at the URL) is not necessary before indexing is performed.

Figure 7:
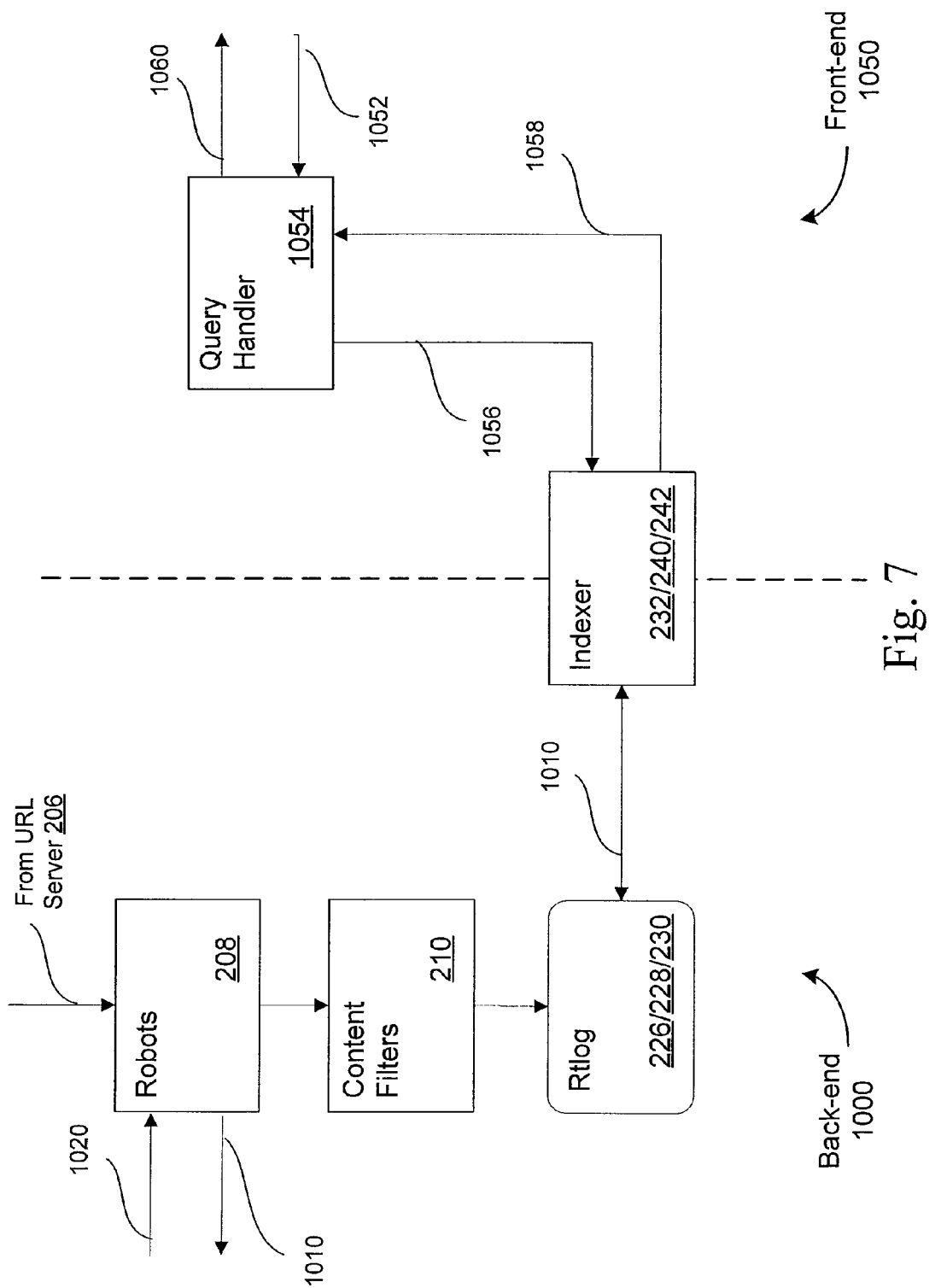
FIG. 7 illustrates an indexer capable of performing the back-end function of indexing documents as they arrive from one or more log files, also capable of performing the front-end function of returning lists of documents in response to respective queries submitted by users.

FIG. 7 illustrates an indexer 232/240/242 performing the back-end function of indexing documents, or the URLs that documents reside at, based on one or more Rtlog files 226/228/230. Indexer 232/240/242 also performs front-end functions, including returning lists 1058 of documents in response to respective queries 1056. Indexer 232/240/242 is any one of real-time indexer 232, daily indexer 240, or base indexer 242 (each depicted in the larger context of a crawling system in FIG. 2). For clarity, the indexer will hereafter be referred to simply as indexer 232. Similarly, Rtlog 226/228/230 is any one of Rtlog real-time 226, Rtlog daily 228, or Rtlog base 230 (FIG. 2). For clarity, it will be referred to hereafter simply as Rtlog 226.

Indexer 232 is, at least conceptually, part of the front-end 1050 of a web search engine as well as being part of the back-end 1000 of the search engine. However, the "front end" portion of the indexer 232 will typically be implemented on a different server than the back-end server that indexes newly crawled documents. The front end portion of the indexer utilizes the indices and other data structures (e.g., DocID to fingerprint maps) generated by the indexer 232 while processing search engine queries. Front-end 1050 receives a query 1052, generally submitted from a user of a client computer (not shown) over a network connection of some type, and returns a list 1060 of documents relevant to the query. List 1060 is preferably ordered in decreasing relevance, documents near the beginning of list 1060 being the most highly relevant to the query 1052. List 1060 optionally includes, for each document on the list, a respective URL, a respective query-dependent relevance score, a respective abstract of the contents of the document, or any combination of these or other items. To generate list 1060, front-end 1050 includes a query handler 1054 and an indexer 232. After receiving query 1052, query handler 1054 submits one or more query terms 1056 to indexer 232. In a front-end 1050 to a system that crawls more than one type of layer (for example, various combinations of a base layer, a daily layer, or a real-time layer), query terms 1056 are submitted to each respective indexer 232 for each layer, and the responses are merged. Indexer 232 returns a list 1058 of URLs that refer to documents containing one or more of the query terms 1056. In a preferred embodiment, list 1058 comprises URL fingerprints of such documents. Advantages of representing the documents in list 1058 as URL fingerprints include the storage savings afforded by use of a fingerprint, which is preferably a 64-bit integer, rather than use of the full URL (which may vary considerably in length) for a given document. Upon receiving list 1058 (or, possibly, receiving a separate list 1058 from multiple indexers 232, 240, and 242), query handler 1054 performs processing that may include merging of multiple lists 1058 and determination of a query-specific relevance score for one or more documents on lists 1058. Finally, query handler returns a list 1060, usually comprised of URLs sorted in order of decreasing query-dependent relevance, to the user. The merging and sorting of documents from lists 1058 can be accelerated if indexer 232 were to supply a list 1058 of documents sorted approximately in order of decreasing relevance. Were lists 1058 so sorted, merging multiple lists 1058 could, in some cases, consist of no more than selecting the top entry from each such list. Even if indexer 1058 were to return a list 1058 of documents sorted approximately in order of decreasing query-independent relevance, the merging and sorting performed by query handler 1054 can be accelerated. An advantage of the teachings of the present disclosure is the ability to assign document identification tags (DocIDs) to documents as they are crawled, the document identification tags encoding information about the relative query-independent relevances of the documents.

Indexer 232 is also part of back-end 1000 of a web search engine. URL server 206 submits a list of URLs to be crawled to robots 208. Robots 208, in accordance with the description of FIG. 2 above, generate hyper-text transfer protocol (http) requests 1010 to various hosts on the Internet. Sometimes, a host will reply to one of requests 1010 by providing robots 208 with the content 1020 of a document from the web. The document could be a web page, written in hyper-text markup language (hereafter, "HTML"), an image, a sound file, or one of any other types of media content found on the Internet. Whether or not robots 208 receive content 1020 in response to queries 1010, robots 208 pass a list of URLs to content filters 210. If the content for a particular URL was successfully retrieved, it is passed from robots 208 to content filters 210. If the content for a particular URL was not successfully retrieved, robots 208 still pass the URL onto content filters 210, possibly together with an annotation describing the reason for unsuccessful retrieval.

Content filters 210 generate, based in part on information received from robots 208, one or more Rtlog files 226. In a preferred embodiment, a separate set of Rtlog files 226 is kept for each layer in the crawl: a real-time Rtlog 226, a daily Rtlog 228, and a base Rtlog 230. For simplicity, hereafter the term Rtlog 226 will be used to refer to any one of these. Not every URL passed to content filters 210 by robots 208 is necessarily included in Rtlog files 226. For example, objectionable content (pornography, slanderous sites, etc.) may be prevented from entering Rtlog files 226 by content filters 210, so that such content will not be indexed and never returned to a user in response to a query. Furthermore, there may be pages on the web which are duplicated, the same content residing at a plurality of distinct URLs. This may be the result of deliberate efforts to deceive the web search engine, in the hopes that the search engine will assign greater importance to pages so duplicated. Thus, in some embodiments, content filters 210 include or interact with a separate module for duplicate document detection and removal. Such a module is described in a related application, entitled Duplicate Document Detection in a Web Crawler System, filed on the same date as this application, hereby incorporated by reference in its entirety.

Indexer 232 examines Rtlog files 226 periodically, continuously, or in any one of a number of time fashions. Indexer 232, upon finding a URL whose content has changed since indexing was last performed, or a URL that does not appear in the index at all, retrieves information about the URL from Rtlog 226. Then, indexer 232 incorporates the most recent information about the URL in latest version of the index (not shown). In this way, recent information about the URLs that have been processed by content filters 210 is available to the front-end 1050. Thus, users submitting queries 1052 need not wait for the entire web (or even an entire segment or partition thereof) to be crawled before a document can be returned as part of the list 1060 in response to their queries. Advantages of this feature include the enhanced fidelity of the index and its responses 1058 with respect to pages whose content, location, availability, or other characteristics change rapidly (on the time-scale of days or weeks).

Figure 8:
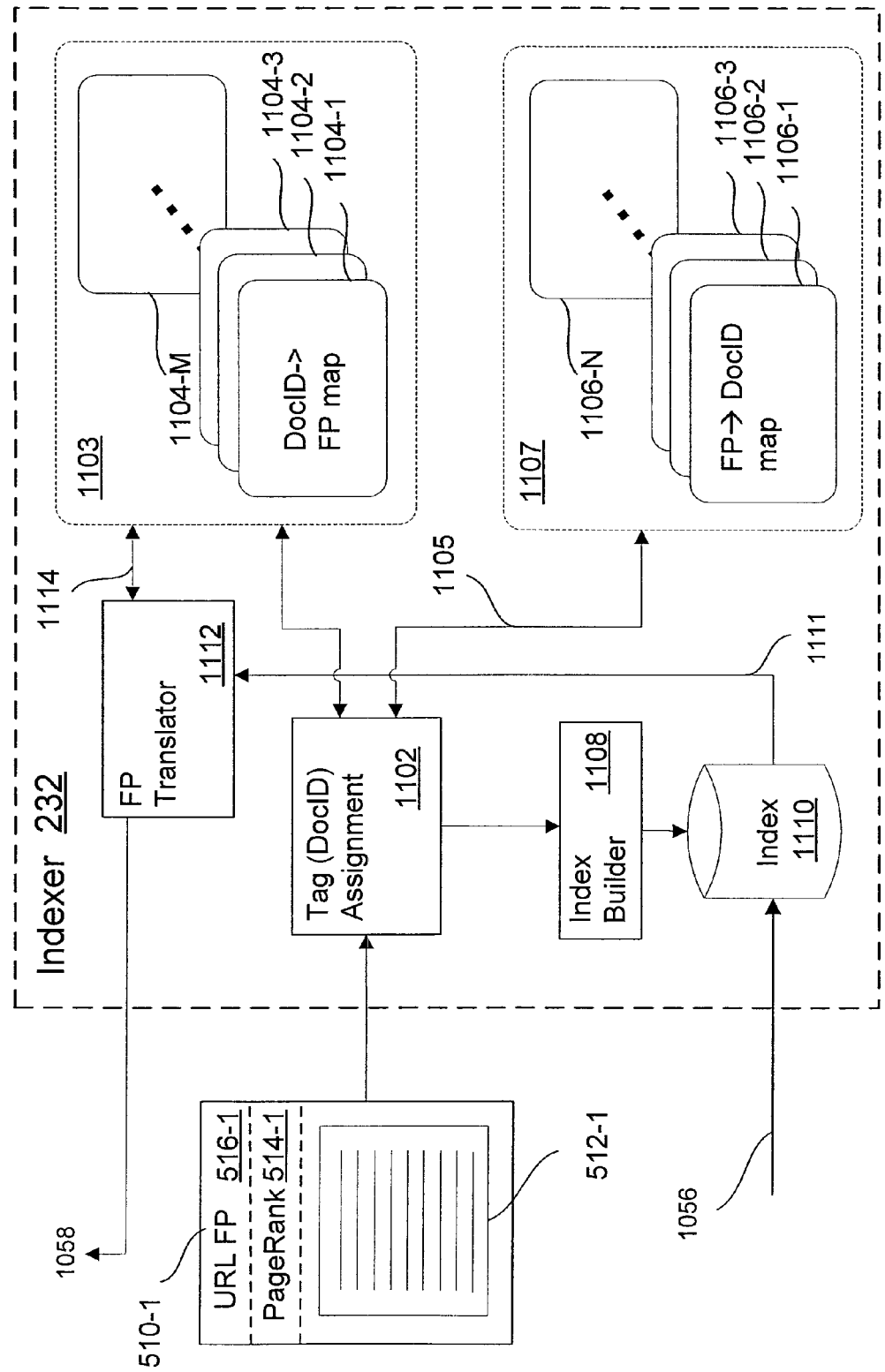
FIG. 8 illustrates an embodiment of an indexer, including mechanisms for assigning document identification tags to new documents as they arrive in one or more log files.

An Indexer for real-time indexing of documents. Examining the operation of indexer 232 in more detail, FIG. 8 illustrates an embodiment of an indexer 232. A record 510-1 from Rtlog files 226 contains various information about a document residing at a particular URL. For example, the URL fingerprint 516-1 of the particular URL is contained in record 510-1. Record 510-1 further includes information about the query-independent relevance of the document. In some embodiments this includes the PageRank 514-1 of the document. The content 512-1 of the document itself, if the document was successfully retrieved by robots 208, may also be present in record 510-1. Various other entries are optionally included in record 510-1, but are not depicted in FIG. 8.

Indexer 232 receives record 510-1 and processes it with tag assignment module 1102. Among other functions, tag assignment module 1102 determines if the document represented by record 510-1 has already been indexed and placed in index 1110. Associated with each document in the index 1110 is a document identification tag (hereafter, "DocID") used for representing the document in the index 1110. Preferably, the DocID is a 32-bit integer. By using DocIDs to represent documents rather than, for example, the URL fingerprint of a document, the amount of storage required by index 1110 is reduced. Additionally, the URL fingerprint is determined by a hash function that does not take as part of its input any metric of relevance, query-independent or otherwise. In contrast, DocIDs are determined by module 1102 based, at least in part, on the query-independent relevance metric 514-1 of the document. Thus, a DocID can encode information about the query-independent relevance of the document to which it is assigned. In a preferred embodiment, the relative ranking of two documents in index 1110 can be determined based on the respective DocIDs of the two documents. Thus, if the DocID assigned to a first document is greater in value than the DocID assigned to a second document, it can be determined that the query-independent relevance of the second document is higher than that of the first. In other words, low DocID values correspond generally to high query-independent relevance. However, small differences in DocID values, such as between two DocID's in the same tier of DocIDs, may not indicate any difference in query-independent relevance.

Indexer 232, as a consequence of the index building process, returns inverse posting lists of documents matching a query term in order of increasing DocID. Thus, in a preferred embodiment, the inverse posting lists returned by indexer 232 are sorted in order of decreasing query-independent relevance, highly relevant documents appearing earlier in the list than less relevant documents. One goal of tag assignment module 1102 is, then, to assign DocIDs so that the DocIDs assigned approximately reflect the query-independent relevance of the associated documents.

To determine if the document represented by record 510-1 has already been placed in index 1110, tag assignment module 1102 first examines layered set 1107 of sorted fingerprint to DocID maps 1106. Layered set 1107 of sorted maps 1106 is a time-ordered sequence of sorted maps 1106. Each map (for example, 1106-1) contains one or more pairings of a URL fingerprint to a DocID. The pairings in maps 1106 are keyed and sorted by fingerprint. Each sorted map in layered set 1107 of sorted maps 1106 covers a range of logical or physical time. If the URL fingerprint 516-1 of the document represented by record 510-1 is found in any of the maps 1106 in layered set 1107, module 1102 retrieves the DocID corresponding to URL fingerprint 516-1. If, on the other hand, the URL fingerprint 516-1 of the document represented by record 510-1 is not found in any of the maps 1106 in layered set 1107, module 1102 proceeds to assign the document a new DocID.

Tag assignment module 1102 stores an internal representation of assigned DocIDs, and at various times outputs a new sorted fingerprint (FP)-to-DocID map 1106. For example, the internal representation of module 1102 may have no more room to store new DocID assignments, forcing the output of a new map 1106. In other cases, a predetermined amount of time may have lapsed since the most recent map 1106 was output, triggering the output of a new FP-to-DocID map (for example, 1106-N) so as to keep the information embodied in the layered set 1107 of maps 1106 recent. The repeated generation of maps 1106 by module 1102 results in a plurality of maps 1106 in set 1107, some of which are older than others. For example, map 1106-N may be the most recent map, containing information that supercedes, or contradicts, information in older map 1106-3. Thus, a mechanism for resolving such conflicts is needed.

A merging rule specifies how older and newer entries in the maps 1106 having the same key should be combined. In some embodiments, the merging rule dictates that newer data should completely replace older data. In other embodiments, the merging rule may be more complex. For example, a special delete entry may allow a newer entry to delete any and all older entries with the same key. The current state of all information for a particular key can be reconstructed by performing lookups in all of the sorted maps 1106 and applying the appropriate merging rule for all entries that are found corresponding to the particular key. To increase the efficiency of these lookups, subsets of the sorted maps are merged together, generating merged sorted maps. This process is described in further detail in conjunction with the discussion of FIG. 12, below. Similar considerations apply to layered set 1103 of sorted DocID-to-FP (fingerprint) maps 1104.

If URL fingerprint 516-1 cannot be found in the layered set 1107 of sorted fingerprint-to-DocID maps 1106, the document represented by record 510-1 is assigned a DocID before it is indexed by index builder 1108. The details of the assignment of a DocID to a new document are discussed in conjunction with FIG. 9, below. Tag assignment module 1102, upon assigning a new DocID, maintains an internal representation of this assignment. At some later point in time, module 1102 outputs this information in a new sorted fingerprint-to-DocID map 1106-N and a new sorted DocID-to-fingerprint map 1104-M. Sorted DocID-to-fingerprint map 1104-M has a similar structure and function to sorted fingerprint-to-DocID map 1106-N, with the exception that sorted DocID-to-fingerprint map 1104-M, like all maps in set 1103, are sorted and keyed by DocID rather than by URL fingerprint.

Additionally, after assigning a DocID, module 1102 provides record 510-1, along with the assigned DocID, to index builder 1108. Index builder 1108 then, when rebuilding (or adding information to) index 1110, adds the document represented by records so received to the new version of the index 1110.

The front-end aspects of indexer 232 include the ability of the index 1110 to respond to queries submitted by users or other parts of the search engine system. Index 1110 responds to query 1056 by generating a list 1111 of DocIDs. List 1111 is also referred to as an inverse posting list, as will be appreciated by one skilled in the art of database system design. For each DocID on list 1111, the respective document it represents contains at least one of the words in the query 1056. However, because the search engine system does not use DocIDs to represent documents, the DocIDs on list 1111 must be translated into URL fingerprints, or some other globally unique representation, before being output as part of response 1058 of indexer 232 to query 1058. For example, DocIDs are, in some embodiments, only unique within a particular partition or segment of a layer 900 (FIG. 6). List 1111 is submitted to fingerprint translator 1112, which exchanges information 1114 with the current layered set 1103 of sorted DocID-to-FP maps 1104. Based on information 1114, fingerprint translator 1112 generates list 1058 of URL fingerprints corresponding to the list 1111.

Layered set 1107, only used to determine whether a particular URL FP has already been indexed, is no longer needed once indexing is complete. Set 1103, on the other hand, is a persistent data structure. Methods and data structures for compressing the size of and increasing the access speed to sorted maps 1104 in layered set 1103 are discussed in conjunction with the discussion of FIG. 11, below.

Figure 9:
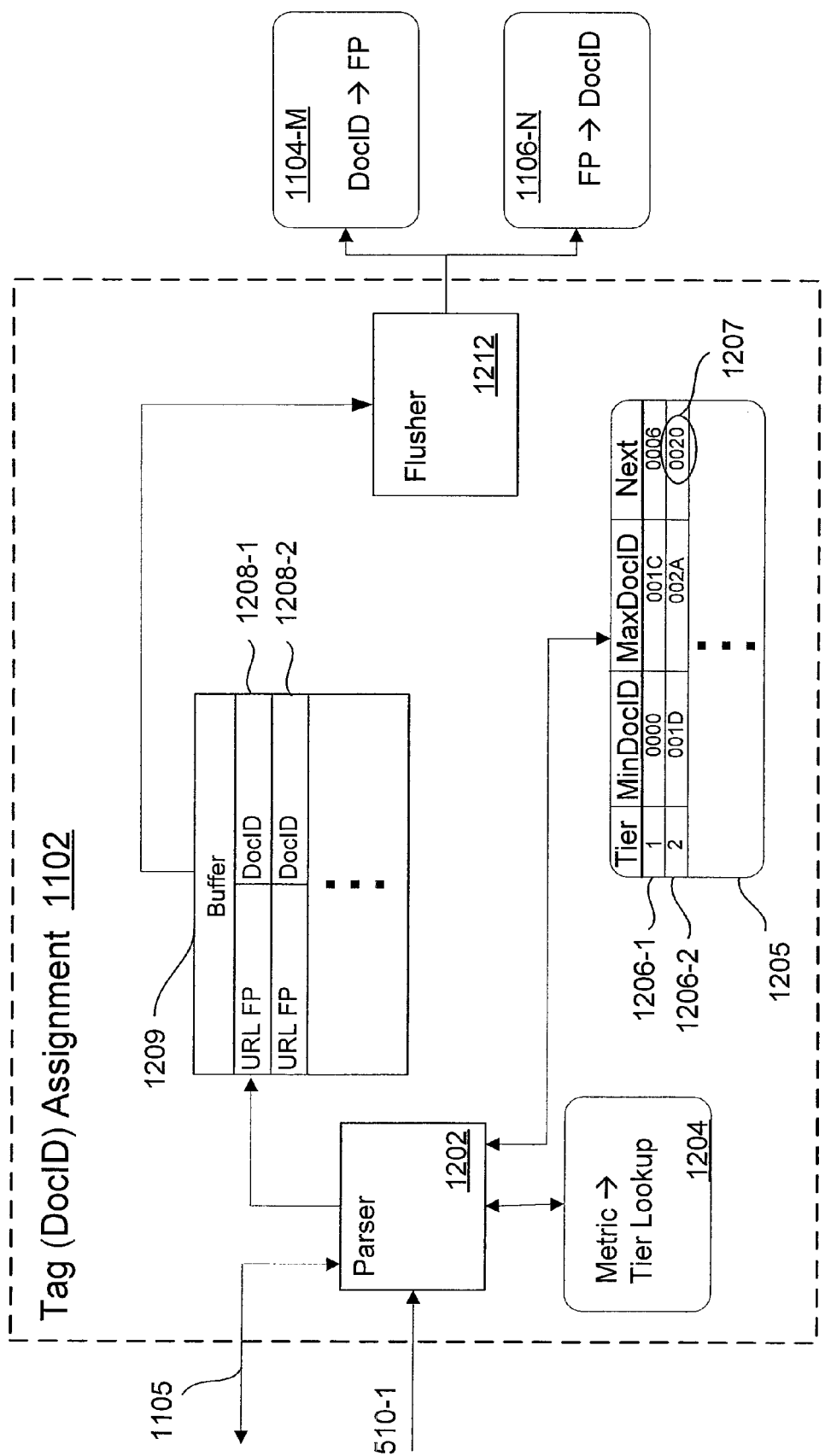
FIG. 9 illustrates an embodiment of a document tag assignment module.

Assigning a new DocID to a document. FIG. 9 illustrates an embodiment of tag assignment module 1102. Module 1102 receives URL fingerprint 516-1 as part of record 510-1 (FIG. 8). Parser 1202 first determines whether fingerprint 516-1 has been previously indexed or assigned a DocID by accessing, via communication 1105, layered set 1107 of sorted maps (not depicted). If fingerprint 516-1 has not been assigned a DocID previously, parser 1202 proceeds to assign one. Module 1102 keeps an internal representation of the assignment of DocIDs to fingerprints in data structure 1205. In one embodiment, a DocID is a 32-bit integer, and the space of all DocIDs is divided into 128 tiers, as represented by data structure 1205. In other embodiments, the size of DocID may be larger or smaller than 32 bits, and the number of tiers may be larger or smaller than 128. Each record (for example, 1206-1) in data structure 1205 includes information about a respective tier of DocIDs. For each tier, a respective tier number (the column labeled "Tier" in FIG. 9), a respective minimum DocID, a respective maximum DocID, and a respective next available DocID (the column labeled "Next" in FIG. 9) are stored. Taken together, the minimum DocID and the maximum DocID define the range of DocIDs associated with the tier. The ranges of DocIDs associated with the tiers are preferably non-overlapping. This is true, for example, in the situation depicted in FIG. 9, where the range of DocIDs associated with tier 1 (0000-001C, as represented in hexadecimal notation) does not overlap with that associated with tier 2

(001D-002A). The next available DocID for a tier may be stored in data structure 1025 as the complete DocID of the next available DocID, as the arithmetic difference between the next available DocID and the minimum DocID for that tier, or by any number of other methods. It should also be noted that some tiers may have large ranges of DocIDs than other tiers. The sizes of the tiers, in terms of number of DocIDs, may be based on historical experience with respect to the relative numbers of documents that fall within the page rank or score range associated with each tier.

In another embodiment, the tier records 1206 do not have a tier column and have only one of the minimum and maximum DocID columns. In this embodiment the tier number or ID is implied from the position of the record 1206 for each tier, and the other end of the DocID range is determined by inspection of the record before or after the record for the tier in question.

In yet other embodiments, the tier records 1206 include one or more additional fields to specify the range of PageRank values associated with each tier. This information is used by the Metric to Tier Lookup 1204 to select the tier for each new document, as further described elsewhere in this document.

For a URL fingerprint 516-1 that has not yet been assigned a DocID, parser 1201 first determines, by querying metric to tier lookup 1204, from which tier to assign a new DocID. Parser 1201 submits the query-independent metric 514-1 for record 510-1 and determines a selected tier. In some embodiments, metric to tier lookup 1204 is a function rather than a table. In a preferred embodiment, metric to tier lookup 1204 associates a respective range of values of a query-independent relevance metric (e.g., PageRank) with each tier. In this embodiment, parser 1202 selects a tier by selecting the tier for which the query-independent metric 514-1 of the new document falls within the respective predetermined range of metric values associated with the tier. Furthermore, in a preferred embodiment, the ranges of DocIDs associated with the tiers monotonically decrease with respect to the ranges of metric values associated with the tier by lookup 1204. That is to say that if a first tier has associated with it a first range of metric values, the first range is uniformly greater than a second range of metric values associated with a second tier, and the range of DocIDs associated with the first tier will be uniformly less than the range of DocIDs associated with the second tier.

After determining the tier from which to assign a DocID, parser 1202 examines the relevant record 1206 in data structure 1205 to determine the next available DocID for the selected tier. In FIG. 9, parser 1202 determines that tier 2 is the appropriate tier and that "0020" is next available DocID 1207 in that tier. Parser 1202 then increments (or, in alternate embodiments, decrements) the next available DocID 1207 entry in record 1206-2. In preferred embodiments, the incrementing of next available DocID 1207 results in documents that are assigned DocIDs earlier in time being assigned DocIDs lower in numerical value. Documents are generally assigned DocIDs in the order in which their respective URLs are crawled, so this results in earlier crawled documents (which may have been scheduled to be crawled earlier due to their authority or importance) having lower DocIDs. In these embodiments, DocIDs in the range from the "MinDocID" entry for the selected tier up to, but not including, the "Next" entry for the selected tier are already assigned to documents. Thus, by assigning the DocID appearing in the "Next" entry for the selected tier and incrementing this entry, parser 1202 effectively assigns the minimum available DocID for the selected tier. In contrast, alternate embodiments, by decrementing next available DocID 1207, assign lower DocIDs to documents that have been crawled more recently. It may be appropriate to assign recently crawled documents relatively lower DocIDs where, for example, the contents of the documents in the index change rapidly (such as is the case for news sites on the Internet) and the fidelity of the index can therefore only be trusted for recently indexed documents. In these embodiments, DocIDs in the range from the "MaxDocID" entry for the selected tier down to, but not including, the "Next" entry for the selected tier are already assigned to documents. Thus, by assigning the DocID appearing in the "Next" entry for the selected tier and decrementing this entry, parser 1202 effectively assigns the maximum available DocID for the selected tier. As the final step in assigning a new DocID, parser assigns the DocID "0020" to fingerprint 516-1 by storing a corresponding entry 1208, containing the URL fingerprint and the assigned DocID, in a buffer data structure 1209. The steps of receiving record 510-1, selecting a tier, and assigning a DocID to a new document are repeated with respect to one or more additional new documents. The buffer data structure 1209 stores entries representing each assigned URL fingerprint to DocID mapping until a flush condition is satisfied, at which time the information in the buffer data structure 1209 is sorted by URL fingerprint to produce a sorted FP to DocID map 1106, and sorted by DocID to produce a sorted DocID to FP map 1104.

Flushing operations. Flusher 1212 monitors buffer data structure 1209 to determine if a flush condition has been met. The flush condition may depend on any number of temporal or storage considerations. For example, in one embodiment, the flush condition is satisfied if a predetermined amount of time has lapsed since the last satisfaction of the flush condition. In some embodiments, the flush condition may be satisfied if a predetermined number of mapping entries 1208 have been written to the buffer 1209. When the flush condition has been met, flusher 1212 generates two sorted maps 1104-M and 1106-N representing the mapping of DocIDs to URL fingerprints and the mapping of URL fingerprints to DocIDs, respectively. A sorted map 1104-M, keyed and sorted by DocIDs and containing one or more DocID-FP pairings, is generated. Additionally, a sorted map 1106-N, keyed and sorted by URL fingerprint, and containing one or more FP-DocID pairings, is also generated. Flusher 1212 also empties or re-initializes the buffer data structure 1209 to prepare it to receive new mapping entries.

Although depicted separately in FIG. 9 for clarity of exposition, flusher 1212 and parser 1202 may be embodied in the same module. For example, flusher 1212 and parser 1202 may be embodied in a single computer system, the computer system including computer system instructions for executing the tasks associated with both flusher 1212 and parser 1202.

In other embodiments, globally unique identifiers (for example, the URLs themselves) other than URL fingerprints are stored in the slots of buffer data structure 1209.

Multi-level maps for fast resolution of URL fingerprint from DocID. As mentioned previously, the layered sorted maps 1106 that are keyed and sorted by URL fingerprint are only needed during a crawl to determine if a given URL fingerprint already has been assigned a DocID. Thus, maps 1106 may be destroyed at the end of a crawling epoch. In contrast, layered sorted maps 1104 (keyed and sorted by DocID) are needed for the front-end functionality of the web search engine. Thus, maps 1104 are persistent data structures, and it is desirable to devise methods and data structures for reducing the amount of storage and time associated with them.

Figure 10:
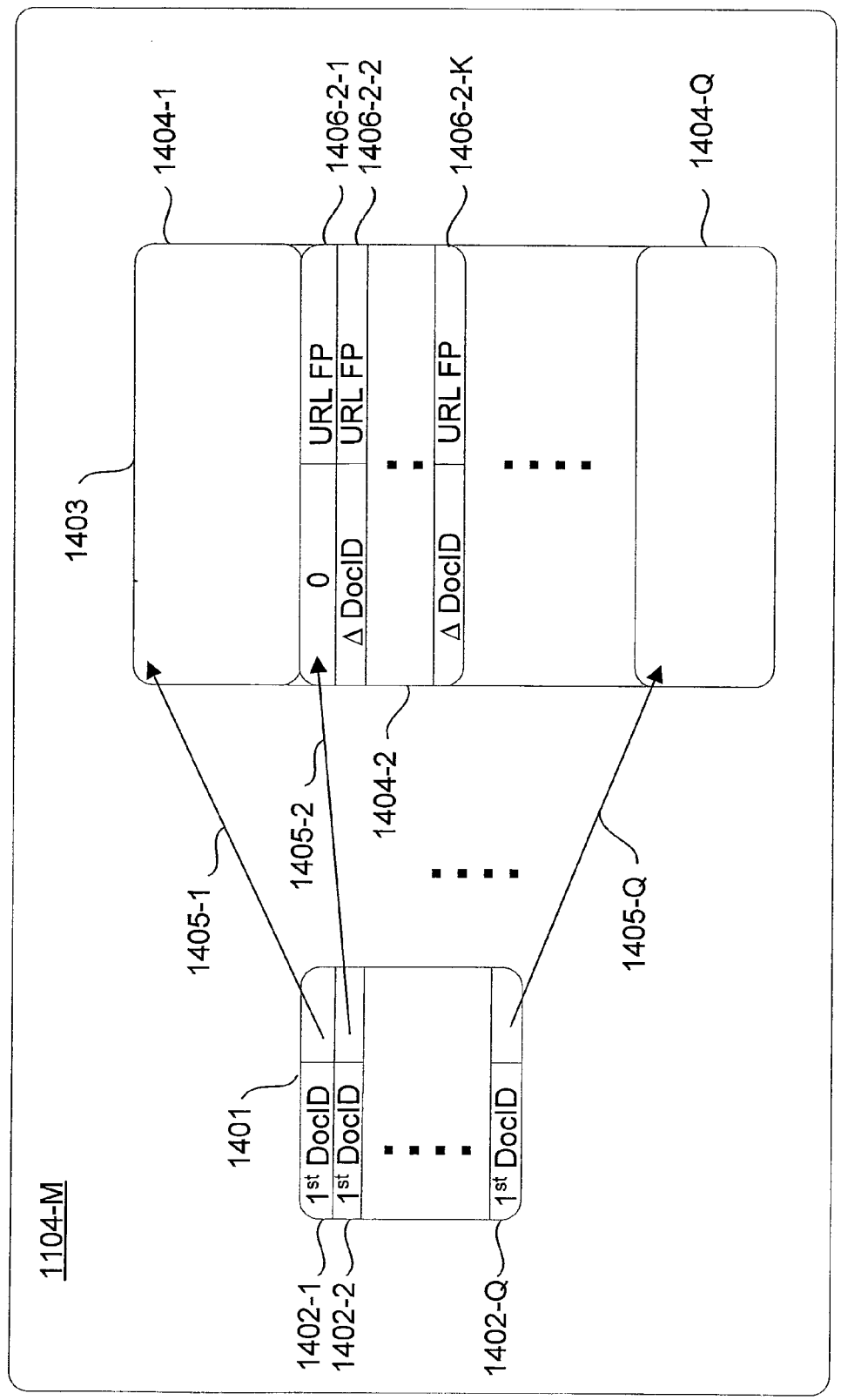
FIG. 10 illustrates a multi-level data structure for storing a URL fingerprint (FP) to document identification tag (DocID) sorted map.

To this end, FIG. 10 illustrates a multi-level document identification tag (DocID) to URL fingerprint (FP) map 1104-M. Multi-level map 1104-M comprises first level 1401 and second level 1403 table or other data structure. Forcing access to map 1106-M to traverse two levels allows a relatively simple search algorithm (e.g., a linear search) to be used in each level, without incurring the cost of an exhaustive search through all records in the map. Second level 1403 of map 1106 is partitioned into a plurality of buckets 1404. Map 1104-M is keyed by DocID. First level 1401 contains a plurality of records 1402. Each record 1402 comprises a DocID-pointer pairing to determine which bucket, if any, in second level 1403 to access to determine the URL fingerprint associated with a particular DocID. For example, record 1402-1 contains the first DocID in bucket 1404-2, and a pointer 1405-2 to the first record 1406-2-1 in bucket 1404-2. Similarly, record 1402-Q contains the first DocID in bucket 1404-Q, and a pointer 1405-Q to the first record 1406-Q-1 in bucket 1404-Q. Records 1402 are preferably sorted by first DocID to enable unambiguous determination of the appropriate bucket for a given DocID. Thus, if the URL fingerprint corresponding to a particular DocID is desired, and the particular DocID is greater than the first DocID in record 1402-2, but less than the first DocID in record 1402-3, it can be determined that information about the particular DocID must reside in bucket 1404-2.

Use of multi-level map 1104-M would then consist of following the pointer in record 1402-2 to the first record 1406-2-1 of bucket 1404-2. Each record 1406-2-1, 1406-2-2, . . . , 1406-2-K in bucket 1404-2 includes two entries: a Δ DocID value, representing the difference between the DocID and the first DocID stored in the corresponding record 1402-2 in first level 1401 and the URL fingerprint associated with the DocID. By comparing the difference between the particular DocID and the first DocID 1402-2 to the Δ DocID entries in each record in bucket 1404-2, the record 1406-2-X that corresponds to the particular DocID is readily found. The URL fingerprint that the particular DocID is assigned to can then be found by reading the second entry in record 1406-2-X. In some embodiments, records 1406-2-1, 1406-2-2, . . . , 1406-2-K are sorted by Δ DocID, so that an efficient search (e.g., a bisection search) can be used to rapidly locate the appropriate record. In other embodiments, the records 1406-2-1, 1406-2-2, . . . , 1406-2-K are in no particular order. Given the relatively small size of the buckets, however, even an exhaustive search for a particular DocID is not prohibitively expensive.

Figure 11:
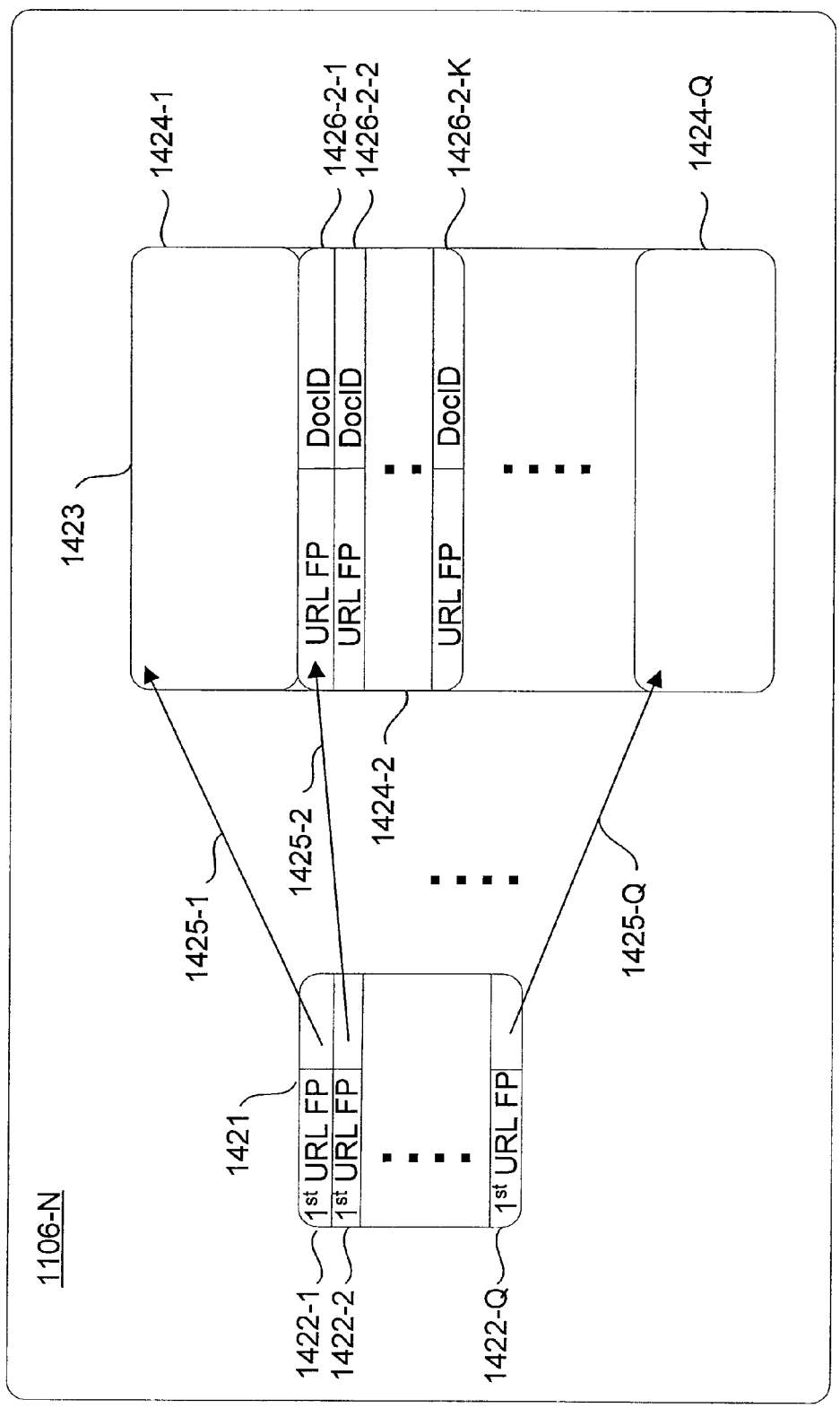
FIG. 11 illustrates a multi-level data structure for storing a document identification tag (DocID) to URL fingerprint (FP) sorted map.

FIG. 11 shows a multi-level map 1106-N for mapping URL fingerprints to DocIDs. This multi-level map that is similar in structure to the multi-level map 1104-M described above with reference to FIG. 10, and therefore only the differences need to be discussed. The first level table 1421 has records 1422 that identify the first URL fingerprint in each bucket 1424 in the second level table 1423. The records 1426 in the buckets 1424 each contain a URL fingerprint value and a DocID value, representing a FP to DocID mapping.

Figure 13:
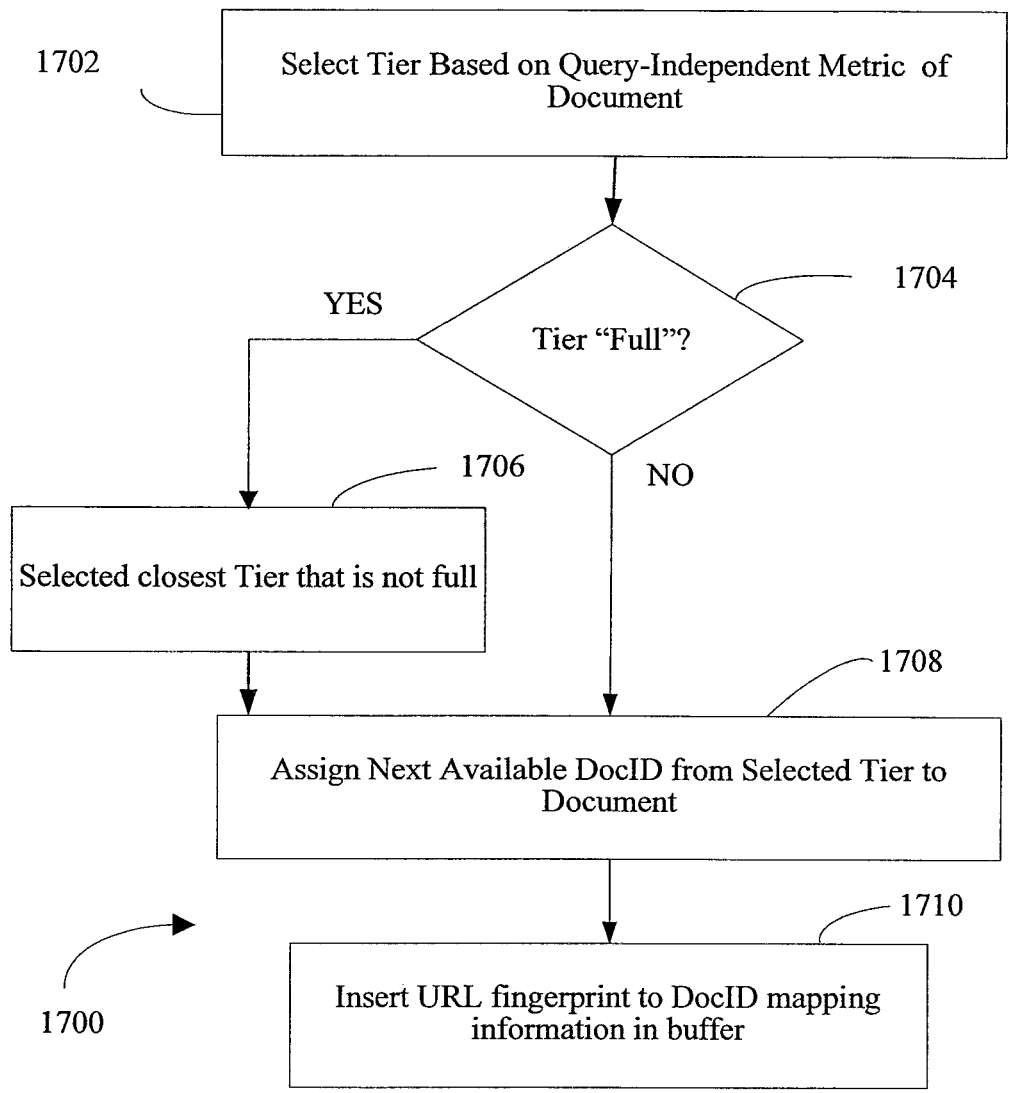
FIG. 13 illustrates a method of assigning a DocID to a document.

Overflow of tier. FIG. 13 illustrates a method of assigning a DocID to a new document even when all the DocIDs in a tier have already been assigned to other documents. If the DocID ranges for the tiers are well selected, this condition will likely never arise. Nevertheless, in some embodiments, the system includes a procedure for handling the assignment of DocIDs even when one or more of the tiers are full. Referring to FIG. 13, in a method 1700 of assigning a DocID to a new document, step 1702 first selects a tier based on a query-independent metric (for example, PageRank 514-1 in record 510-1 from Rtlog 226, 228, or 230) associated with the new document. Selecting a tier is performed, in some embodiments, by accessing metric to tier lookup 1204 (FIG. 9), which may be a function, a table, or other means for associating each tier with a range of query-independent metric values.

Step 1704 then checks to see if the tier is full, for instance by checking table 1205 to see if all the DocIDs allocated to the selected tier have already been assigned to other documents. If so (1704, Yes), the method selects the tier closest to the originally selected tier that is not full at step 1706. It is important to select a closest tier because the DocID assigned to each document is used by the search engine as general indication of the document's importance, and therefore the DocID assigned the document should be as close as possible to the range of DocIDs normally assigned to documents having approximately the same page rank as the new document being processed here. Once a non-full tier has been selected, the next available DocID for the selected tier is assigned to the new document (step 1708). In some embodiments, the DocID is determined by accessing data structure 1205 and looking up the "next" DocID for the selected tier, assigning that DocID to the new document, and then incrementing or decrementing the "next" DocID for the selected tier, as described above. Finally, the assigned DocID is associated with the new document by storing an URL fingerprint to DocID mapping entry in the buffer data structure at step 1710.

Figure 12:
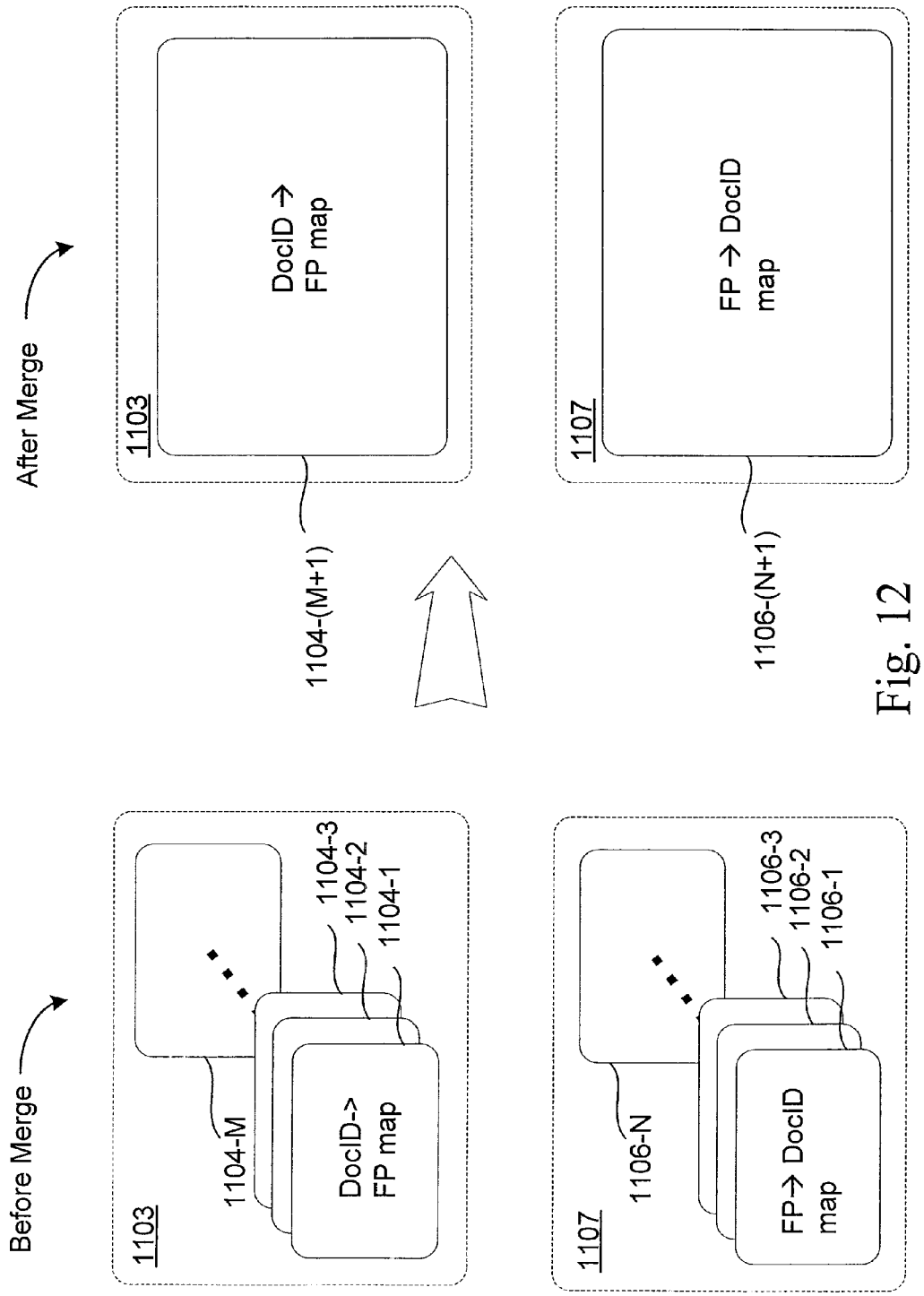
FIG. 12 illustrates merging of a layered set of sorted URL fingerprint to DocID maps and merging of a layered set of sorted fingerprint to DocID maps.

Merging of multiple layered sorted maps. FIG. 12 illustrates the merging of multiple layered sorted fingerprint to DocID maps, and the merging of multiple layered sorted DocID to fingerprint maps. Before the merge is performed, accessing information about, for example, all currently assigned DocIDs requires accessing each of the Maps 1104 in the set 1103. Thus, although each map 1104 is sorted and keyed by DocID, allowing rapid lookup of the sought entry, the number of maps 1104 in the set 1103 at some point becomes a computational bottleneck in the lookup of information.

To mitigate this problem, tag assignment module 1102 (FIG. 8) merges two or more of the maps in a set (1103 or 1107) of maps. Module 1102 may perform this operation periodically, waiting for either a predetermined amount of time to pass since the last merge or waiting for a predetermined number of new sorted maps to appear before merging. Other criteria module 1102 may employ to determine when to merge include, but are not limited to, a predetermined amount of idle processing time passing in module 1102 or the completion of a crawl epoch.

To explain the merging operation in more detail, consider the set of DocID to fingerprint maps 1103. Merged map 1104-(M+1) contains all of the records from each map 1104 in the set of maps 1103. Furthermore, the records in merged map 1104-(M+1) are sorted and keyed by DocID. Thus, a rapid search algorithm (e.g., binary search) can be applied to locate the record in map 1104-(M+1) corresponding to a particular DocID. To the extent that multiple records are found in the set 1103 of maps at the time for merging, a particular merging rule that specifies how older and newer records with the same key should be combined is employed. In one embodiment, newer data completely replaces older data. In other embodiments, the merging rules are more complex. For example, a special delete entry allows a newer entry to delete any and all older entries with the same key. Notice however, that in operation of the tag assignment module 1102 in accordance with one embodiment, duplicate records such as this will not be produced in set 1103 (nor in set 1107).

Although, as depicted in FIG. 12, all of the sorted maps 1104 in the set 1103 of maps may be merged, any subset of the set 1103 of maps may also be merged. Entirely analogous considerations and techniques apply in the merging of the fingerprint to DocID maps 1106 from the layered set 1107 of sorted maps.

Figure 14:
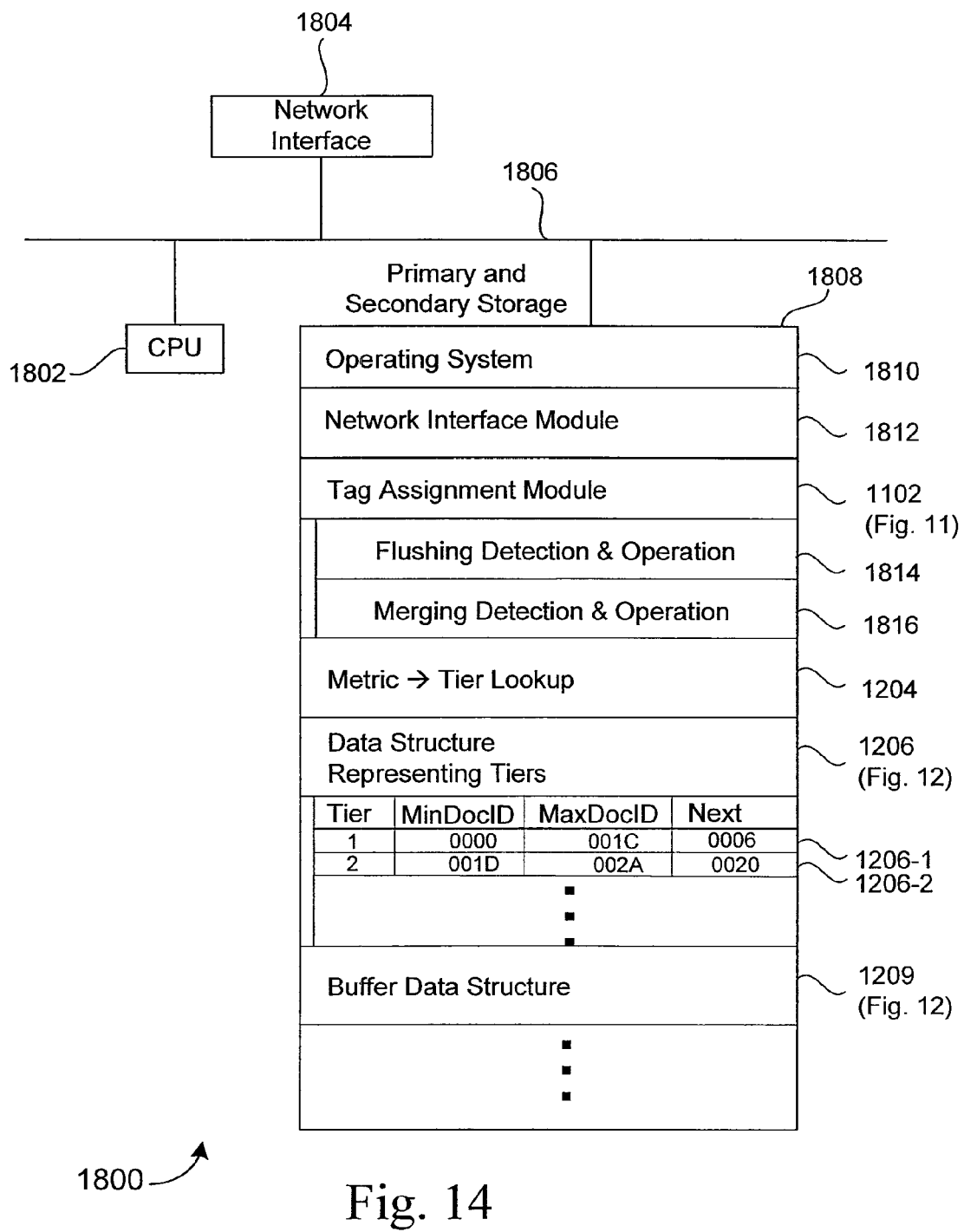
FIG. 14 illustrates a computer system for implementing the methods disclosed herein.

A computer system for assigning document identification tags. In a preferred embodiment, the search engine system 1800 is implemented using one or more computer systems, as schematically shown in FIG. 14. As will be appreciated by those of skill in the art, search engine systems designed to process large volumes of queries may use more complicated computer architectures than the one shown in FIG. 14. For instance, a front end set of servers may be used to receive and distribute queries among a set of back end servers that actually process the queries. Furthermore, a third set of servers may be used to crawl and index the set of documents to be included in the index of the search engine system. In such a system, the system 1800 shown in FIG. 14 would be one of the third set of servers.

The computer system will typically have one or more central processing units (CPU's) 1802, one or more network or other communications interfaces 1804, primary and secondary storage 1808, and one or more communication busses 1806 for interconnecting these components. Primary and secondary storage 1808 can include high speed random access memory and can also include non-volatile memory, such as one or more magnetic disk storage devices (not shown). Primary and secondary storage 1808 can include mass storage that is remotely located from the central processing unit(s) 1802. The primary and secondary storage 1808 preferably stores:

an operating system 1810 that includes procedures for handling various basic system services and for performing hardware dependent tasks;

a network interface module 1812 that is used for connecting the system 1800 to various other computers (the content filters 210 and query handler 1054 in FIG. 7) and for accessing and receiving associated log files (Rtlogs 226, 228, and 230 in FIG. 7), the log files including query-independent information about one or more documents to be assigned a DocID, via one or more communication networks, such as, the Internet, other wide area networks, local area networks, metropolitan area networks, and so on;

a tag assignment module 1102, preferably including instructions 1814 for detection of the satisfaction of a flush condition and execution of a flush operation and instructions 1816 for detection of the satisfaction of a merge condition and execution of a merge operation;

a query-independent metric to tier lookup data structure 1204 or function for determining, based on the value of a query-independent metric for a document, from which one of the plurality of tiers a DocID will be assigned;

a data structure 1206 representing a subdivision of a set of available DocIDs into a plurality of tiers, the data structure 1206 including a respective record 1206-1, 1206-2, ... for each tier, the record containing information about a range of DocIDs associated with the tier (embodied in the MinDocID and MacDocID columns in FIG. 15) and the next available DocID available for assignment from the tier (embodied by the column "Next" in FIG. 15); and a buffer data structure 1209 for temporarily storing the assignment of DocIDs to documents since a last flushing operation, the data structure including a plurality of entries 1208 storing URL fingerprint to DocID mapping information.

Tag assignment module 1102 can include executable procedures, sub-modules, tables and other data structures. Tag assignment module 1102 preferably includes instructions for receiving, via network interface module 1812 query-independent information about a new document. The query-independent information preferably includes a globally unique document identifier (such as the URL fingerprint) and a query-independent metric (such as, for example, the PageRank) rating the relevance of the document. Based on the query-independent metric, module 1102 determines, by interacting with query-independent metric to tier lookup 1204, a selected tier. Once the tag assignment module 1102 determines the selected tier, it accesses data structure 1205 to determine the next available DocID for the selected tier by accessing the appropriate record for the selected tier. Module 1102 then assigns the next available DocID as determined to the new document and, in one embodiment, increments the entry in the "Next" column of the record in data structure 1206 corresponding to the selected tier. In an alternate embodiment, module 1102 decrements this entry. The assignment of a DocID to a new document is stored in an entry 1208 in the buffer data structure 1209.

In some embodiments, tag assignment module 1102 includes instructions 1814 for detecting the satisfaction of a flushing condition and executing a flush operation. The flush condition may depend on any number of temporal or storage considerations. For example, in one embodiment, the flush condition is satisfied if a predetermined amount of time has lapsed since the last satisfaction of the flush condition. In some embodiments, the flush condition may be satisfied if a predetermined number of entries 1208 have been stored in the buffer data structure 1209.

When the flush condition has been met, tag assignment module 1102 generates two sorted maps representing the assignment of DocIDs to documents. A sorted map 1104-M (not shown) keyed and sorted by DocID is generated and distributed via network interface module 1812. Additionally, a sorted map 1106-N (not shown) keyed and sorted by URL fingerprint is generated and distributed via network interface module 1812. Additionally tag assignment module 1102 clears or re-initializes the buffer data structure 1209.

In some embodiments, tag assignment module 1102 includes instructions 1816 for detecting the satisfaction of a merge condition and for executing a merge operation. Detailed exposition of the detection of satisfaction of merge conditions and execution of merge operations can be found in the discussion of FIG. 12, above.

All references cited herein are incorporated herein by reference in their entirety and for all purposes to the same extent as if each individual publication or patent or patent application was specifically and individually indicated to be incorporated by reference in its entirety for all purposes.

The foregoing description, for purposes of explanation, used specific nomenclature to provide a thorough understanding of the embodiments described herein. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

What is claimed is:

1. A computer-implemented method of assigning a document identifier to a new document, the new document to be added to a collection of documents, the method being performed on a computer system having one or more processors and memory storing one or more programs for execution by the one or more processors, the method comprising:

partitioning a set of document identifiers into a plurality of segments, each segment associated with a respective subset of the set of document identifiers, wherein the document identifiers comprise a predetermined set of monotonically ordered document identification tags;

subdividing each of the segments into a plurality of tiers, wherein each tier is associated with a respective subset of the set of document identifiers, and wherein the plurality of tiers are monotonically ordered with respect to a query-independent document importance metric;

receiving query-independent information about the new document, the information including a value of the query-independent document importance metric and a unique document identifier for the new document;

selecting, based at least in part on the unique document identifier, one of the segments;

selecting, based at least on the query-independent information, one of the tiers associated with the selected segment;

assigning to the new document a document identifier from the respective subset of document identifiers associated with the selected tier, the assigned document identifier not previously assigned to any of the documents in the collection of documents, and repeating the receiving, selecting a segment, selecting a tier, and assigning, with respect to one or more additional new documents.

2. The method of claim 1, wherein each tier in the plurality of tiers is associated with a respective predetermined range of metric values; and wherein selecting a tier comprises selecting the tier for which the query-independent document importance metric of the new document falls within the respective predetermined range of metric values associated with the selected tier.

3. The method of claim 2, wherein the respective predetermined ranges of metric values associated with the plurality of tiers are non-overlapping.

4. The method of claim 2, wherein the respective subset of the document identifiers associated with each tier monotonically increases with the position of the tier in the ordering; and wherein the respective predetermined range of metric values associated with each tier monotonically increases with the position of the tier in the ordering.

5. The method of claim 4, wherein assigning a document identifier to the new document comprises assigning to the new document a minimum available document identifier identification tag from the respective subset of document identifiers associated with the selected tier.

6. The method of claim 4, wherein assigning a document identifier to the new document comprises assigning to the new document a maximum available document identifier from the respective subset of document identifiers associated with the selected tier.

7. The method of claim 1, further comprising:
when a flush condition is satisfied, performing a flush operation, including building a sorted map, the sorted map relating globally unique identifiers to document identifiers assigned to documents since a prior flush operation.

8. The method of claim 7, further comprising:
when a merge condition is satisfied, performing a merge operation, the merge operation including merging a layered plurality of sorted maps produced by previous flushing operations, the merge operation further including producing a merged map relating globally unique identifiers to document identifiers assigned to documents.

9. The method of claim 1, further comprising:
when a flush condition is satisfied, performing a flush operation, the flush operation including building a first sorted map and a second sorted map;
wherein the first sorted map is keyed and sorted by globally unique identifiers, and includes for each globally unique identifier a corresponding document identifier; and
wherein the second sorted map is keyed and sorted by document identifiers assigned to documents since a prior flush operation, and includes for each such document identifier a corresponding globally unique identifier.

10. The method of claim 9, wherein the globally unique identifiers are URL fingerprints.

11. The method of claim 10, wherein each URL fingerprint comprises a value produced by applying a one way mapping function to an address associated with a document in the collection of documents.

12. A computer-implemented method of assigning a plurality of document identification tags to a plurality of new documents, the plurality of new documents to be added to a collection of documents, the method comprising:
on a computer system having one or more processors and memory storing one or more programs for execution by the one or more processors:
partitioning a set of valid globally unique document identifiers into a plurality of segments, each segment associated with a respective subset of the set of valid globally unique document identifiers;
subdividing each of the segments into a plurality of tiers, wherein the plurality of tiers are monotonically ordered with respect to a query-independent document importance metric, each segment having an associated, predetermined set of monotonically ordered document identification tags, and each tier of a respective segment having an associated subset of the set of document identification tags for the respective segment;
receiving query-independent information about a new document, the information including a value of the query-independent document importance metric and a globally unique document identifier for the new document;
selecting, based at least in part on the globally unique document identifier, one of the segments;
selecting, based at least on the query-independent information, one of the tiers associated with the selected segment; assigning to the new document a document identification tag from the subset of document identification tags associated with the selected tier, wherein the document identification tag assigned to the new document is unique with respect to document identification tags assigned to other documents in the collection of documents; and
repeating the receiving, selecting a segment, selecting a tier, and assigning, with respect to one or more additional new documents;
wherein the assigned document identification tags are assigned to documents in the collection of documents having globally unique document identifiers associated with the respective segment.

13. The method of claim 12, wherein the set of document identification tags for a first segment includes a plurality of document identification tags in the set of document identification tags for a second segment.

14. A system for assigning a document identification tag to a new document, the new document to be added to a collection of documents, the system comprising:
- one or more processors; and
- memory storing one or more programs to be executed by the one or more processors; the one or more programs comprising instructions for:
  - partitioning a set of monotonically ordered document identification tags into a plurality of segments, each segment associated with a respective subset of the set of monotonically ordered document identification tags;
  - subdividing each of the segments into a plurality of tiers, wherein each tier is associated with a respective subset of the set of document identification tags, and wherein the plurality of tiers are monotonically ordered with respect to a query-independent document importance metric;
  - receiving query-independent information about the new document, the information including a value of the query-independent document importance metric and a globally unique document identifier for the new document;
  - selecting, based at least in part on the globally unique document identifier, one of the segments;
  - selecting, based at least on the query-independent information, one of the tiers associated with the selected segment;
  - assigning to the new document a document identification tag from the subset of document identification tags associated with the selected tier, the assigned document identification tag not previously assigned to any of the documents in the collection of documents;
  - repeating the receiving, selecting a segment, selecting a tier, and assigning, with respect to one or more additional new documents; and
  - wherein the assigned document identification tags are assigned to documents in the collection of documents having globally unique document identifiers associated with the respective segment.

15. The system of claim 14, wherein each tier in the plurality of tiers is associated with a respective predetermined range of metric values; and
- wherein instructions for selecting a tier comprise instructions for selecting the tier for which the query-independent information of the new document falls within the respective predetermined range of metric values associated with the selected tier.

16. The system of claim 15, wherein the respective predetermined ranges of metric values associated with the plurality of tiers are non-overlapping.

17. The system of claim 15, wherein the respective subset of the set of document identification tags associated with each tier monotonically increase with the position of the tier in the ordering; and
- wherein the respective predetermined range of metric values associated with each tier monotonically increases with the position of the tier in the ordering.

18. The system of claim 17, wherein the instructions for assigning a document identification tag to the new document comprise instructions for assigning to the new document a minimum available document identification tag from the respective subset of document identification tags associated with the selected tier.

19. The system of claim 17, wherein the instructions for assigning a document identification tag to the new document comprise instructions for assigning to the new document a maximum available document identification tag from the respective subset of document identification tags associated with the selected tier.

20. The system of claim 14, further comprising instructions for:
- when a flush condition is satisfied, performing a flush operation, including building a sorted map, the sorted map relating globally unique identifiers to document identification tags assigned to documents since a prior flush operation.

21. The system of claim 20, further comprising instructions for:
- when a merge condition is satisfied, performing a merge operation, the merge operation including merging a layered plurality of sorted maps produced by previous flushing operations, the merge operation further including producing a merged map relating globally unique identifiers to document identification tags assigned to documents.

22. The system of claim 14, further comprising instructions for:
- when a flush condition is satisfied, performing a flush operation, the flush operation including building a first sorted map and a second sorted map;
- wherein the first sorted map is keyed and sorted by globally unique identifiers, and includes for each globally unique identifier a corresponding document identification tag; and
- wherein the second sorted map is keyed and sorted by document identification tags assigned to documents since a prior flush operation, and includes for each such document identification tag a corresponding globally unique identifier.

23. The system of claim 14, wherein the globally unique identifiers are URL fingerprints.

24. The system of claim 23, wherein each URL fingerprint comprises a value produced by applying a one way mapping function to an address associated with a document in the collection of documents.

25. A non-transitory computer readable storage medium storing one or more programs configured for execution by a computer, the one or more programs comprising instructions for:
- partitioning a set of monotonically ordered document identification tags into a plurality of segments, each segment associated with a respective subset of the set of monotonically ordered document identification tags;
- subdividing each of the segments into a plurality of tiers, wherein each tier is associated with a respective subset of the set of document identification tags, and wherein the plurality of tiers are monotonically ordered with respect to a query-independent document importance metric;
- receiving query-independent information about a new document, the information including a value of the query-independent document importance metric and a globally unique document identifier for the new document;
- selecting, based at least in part on the globally unique document identifier, one of the segments;
- selecting, based at least on the query-independent information, one of the tiers associated with the selected segment;
- assigning to the new document a document identification tag from the respective subset of document identification tags associated with the selected tier, the assigned document identification tag not previously assigned to any of the documents in a collection of documents;

repeating the receiving, selecting a segment, selecting a tier, and assigning, with respect to one or more additional new documents; and wherein the assigned document identification tags are assigned to documents in the collection of documents having globally unique document identifiers associated with the respective segment.

26. The non-transitory computer readable storage medium of claim 25, wherein each tier in the plurality of tiers is associated with a respective predetermined range of metric values; and wherein instructions for selecting a tier comprise instructions for selecting the tier for which the query-independent information of the new document falls within the respective predetermined range of metric values associated with the selected tier.

27. The non-transitory computer readable storage medium of claim 26, wherein the respective predetermined ranges of metric values associated with the plurality of tiers are non-overlapping.

28. The non-transitory computer readable storage medium of claim 26, wherein the respective subset of the document identification tags associated with each tier monotonically increase with the position of the tier in the ordering; and wherein the respective predetermined range of metric values associated with each tier monotonically increases with the position of the tier in the ordering.

29. The non-transitory computer readable storage medium of claim 28, wherein the instructions for assigning a document identification tag to the new document comprise instructions for assigning to the new document a minimum available document identification tag from the respective subset of document identification tags associated with the selected tier.

30. The non-transitory computer readable storage medium of claim 28, wherein the instructions for assigning a document identification tag to the new document comprise instructions for assigning to the new document a maximum available document identification tag from the respective subset of document identification tags associated with the selected tier.

31. The non-transitory computer readable storage medium of claim 25, further comprising instructions for:

when a flush condition is satisfied, performing a flush operation, including building a sorted map, the sorted map relating globally unique identifiers to document identification tags assigned to documents since a prior flush operation.

32. The non-transitory computer readable storage medium of claim 31, further comprising instructions for:

when a merge condition is satisfied, performing a merge operation, the merge operation including merging a layered plurality of sorted maps produced by previous flushing operations, the merge operation further including producing a merged map relating globally unique identifiers to document identification tags assigned to documents.

33. The non-transitory computer readable storage medium of claim 25, instructions for:

when a flush condition is satisfied, performing a flush operation, the flush operation including building a first sorted map and a second sorted map;

wherein the first sorted map is keyed and sorted by globally unique identifiers, and includes for each globally unique identifier a corresponding document identification tag; and wherein the second sorted map is keyed and sorted by document identification tags assigned to documents since a prior flush operation, and includes for each such document identification tag a corresponding globally unique identifier.

34. The non-transitory computer readable storage medium of claim 25, wherein the globally unique identifiers are URL fingerprints.

35. The non-transitory computer readable storage medium of claim 34, wherein each URL fingerprint comprises a value produced by applying a one way mapping function to an address associated with a document in the collection of documents.

* * * * *